(12) United States Patent
Kim

(10) Patent No.: US 11,561,919 B2
(45) Date of Patent: Jan. 24, 2023

(54) MEMORY CONTROLLER, METHOD OF OPERATING MEMORY CONTROLLER AND STORAGE DEVICE

(71) Applicant: Samsung Electronics Co., Ltd., Suwon-si (KR)

(72) Inventor: Jong Hoon Kim, Hwaseong-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 0 days.

(21) Appl. No.: 17/220,986

(22) Filed: Apr. 2, 2021

(65) Prior Publication Data

US 2022/0050800 A1    Feb. 17, 2022

(30) Foreign Application Priority Data

Aug. 11, 2020  (KR) .................. 10-2020-0100460

(51) Int. Cl.
 *G06F 13/40*   (2006.01)
 *G06F 13/42*   (2006.01)
 *G06F 13/38*   (2006.01)

(52) U.S. Cl.
 CPC ...... *G06F 13/4022* (2013.01); *G06F 13/4291* (2013.01); *G06F 13/385* (2013.01); *G06F 2213/0026* (2013.01)

(58) Field of Classification Search
 CPC ..... H04L 43/00; H04L 69/22; H04L 12/1886; H04L 69/18; H04L 12/4625; H04L 29/06;
 (Continued)

(56) References Cited

U.S. PATENT DOCUMENTS 7,099,969 B2   8/2006   McAfee et al.
7,174,411 B1   2/2007   Ngai
(Continued)

FOREIGN PATENT DOCUMENTS

JP    2012-213121 A    11/2012
JP       5172810 B2     3/2013
(Continued)

OTHER PUBLICATIONS

European Office Action and Search Report dated Jan. 17, 2022 and Jan. 5, 2022 issued in corresponding European Appln. No. 21187936.6.

(Continued)

*Primary Examiner* — Faisal M Zaman
(74) *Attorney, Agent, or Firm* — Harness, Dickey & Pierce, P.L.C.

(57) ABSTRACT

Example memory controllers are disclosed. An example memory controller may include a PHY module including a first PHY terminal connected to a plurality of pins of a device connector, a MAC module including a first MAC terminal that is enabled to form a first lane with the first PHY terminal, and a second MAC terminal that is disabled without being connected to the first PHY terminal, a switch controller configured to receive a signal of a host connector connected to the device connector from at least one of the plurality of pins and output a switch signal in response to the signal of the host connector, and a switch configured to disable the second MAC terminal and form the first lane by connecting the first PHY terminal to the first MAC terminal in response to the switch signal.

19 Claims, 17 Drawing Sheets

(58) Field of Classification Search
CPC .. G06F 13/385; G06F 13/362; G06F 13/4022; G06F 13/4291; G06F 2213/0026
USPC ........ 709/250, 223; 370/469, 252, 392, 356; 710/104, 105, 106, 15
See application file for complete search history.

(56) References Cited

U.S. PATENT DOCUMENTS

| | | | |
|---|---|---|---|
| 7,756,123 B1 | 7/2010 | Huang et al. | |
| 8,018,924 B1* | 9/2011 | Medina | H04L 49/351 370/366 |
| 8,069,293 B1* | 11/2011 | Rogan | G06F 13/385 710/301 |
| 8,626,975 B1 | 1/2014 | Sala | |
| 8,780,927 B2* | 7/2014 | Julien | H04L 45/10 370/400 |
| 9,971,730 B2 | 5/2018 | Remple et al. | |
| 10,346,342 B1* | 7/2019 | Davis | G06F 13/1668 |
| 2006/0123160 A1* | 6/2006 | Duckman | G06F 9/4812 710/48 |
| 2006/0161733 A1* | 7/2006 | Beckett | G06F 13/4059 711/118 |
| 2007/0055797 A1* | 3/2007 | Shimozono | G06F 11/201 710/36 |
| 2008/0320181 A1* | 12/2008 | Lauterbach | G06F 9/4416 710/38 |
| 2009/0327547 A1* | 12/2009 | Cho | H04L 12/2836 710/106 |
| 2011/0122891 A1* | 5/2011 | Diab | H04L 1/0002 370/469 |
| 2012/0328289 A1* | 12/2012 | Julien | H04L 49/557 398/45 |
| 2013/0117470 A1* | 5/2013 | Terlizzi | H01R 13/6683 710/3 |
| 2013/0346653 A1* | 12/2013 | Freking | G06F 13/423 710/104 |
| 2013/0346665 A1 | 12/2013 | Freking et al. | |
| 2017/0026314 A1* | 1/2017 | Liang | H04L 67/125 |
| 2017/0090510 A1* | 3/2017 | Tennant | G06F 1/12 |
| 2018/0336151 A1* | 11/2018 | Moore | G06F 13/426 |
| 2019/0303318 A1* | 10/2019 | Mao | G06F 13/4282 |
| 2020/0326771 A1* | 10/2020 | Wu | G06F 1/3287 |

FOREIGN PATENT DOCUMENTS

| | | |
|---|---|---|
| KR | 10-1266041 B1 | 5/2013 |
| KR | 10-1356905 B1 | 2/2014 |

OTHER PUBLICATIONS

'PHY Interface for the PCI Express™ Architecture' *Intel Corporation*, XP-002477594, 2003, Retrieved from the Internet: www.intel.com/technology/pciexpress/devnet/docs/PIPEMacrol_00.pdf, pp. 1-31.
'Splitting a PCI-Express Port Into Two or More Independent PCI-Express Links' *XPIPCOM*, XP013013207, 2003, pp. 1-4.

\* cited by examiner

FIG. 6

| SIG2 | SIG3 | SIG1 | Port | FormFactor | S_SIG |
|---|---|---|---|---|---|
| 1 | 0 | 1 | Single Port | AIC | Lane Configuration a |
| | | 0 | | EDSFF | Lane Configuration b |
| | | 1 | | N.A. | N.A. |
| | | 0 | | N.A. | N.A. |
| | 1 | 1 | | U.2 | Lane Configuration c |
| | | 0 | | U.3 | Lane Configuration d |
| | | 1 | | N.A. | N.A. |
| | | 0 | | N.A. | N.A. |
| 0 | 0 | 1 | Dual Port | AIC | Lane Configuration e |
| | | 0 | | EDSFF | Lane Configuration f |
| | | 1 | | N.A. | N.A. |
| | | 0 | | N.A. | N.A. |
| | 1 | 1 | | U.2 | Lane Configuration g |
| | | 0 | | U.3 | Lane Configuration h |
| | | 1 | | N.A. | N.A. |
| | | 0 | | N.A. | N.A. |

MEMORY 282

MEMORY CONTROLLER, METHOD OF OPERATING MEMORY CONTROLLER AND STORAGE DEVICE

CROSS-REFERENCE TO RELATED APPLICATION

This application claims priority from Korean Patent Application No. 10-2020-0100460 filed on Aug. 11, 2020 in the Korean Intellectual Property Office, and all the benefits accruing therefrom under 35 U.S.C. 119, the contents of which in its entirety are herein incorporated by reference.

BACKGROUND

1. Technical Field

The present disclosure relates to a memory controller, a method of operating a memory controller and a storage device.

2. Description of the Related Art

The PCI Express (PCIe) interface protocol is widely used in the computing industry for high-speed data transfer. The PCIe provides a bidirectional connection that can transmit and receive data simultaneously. The bidirectional connection includes a simplex transmit path and a simplex receive path, and in order to emphasize this structure, the bidirectional connection model adopted by the PCIe interface protocol is also referred to as a dual-simplex connection model.

Transmission paths and reception paths between PCIe devices that transmit and receive data using the PCIe interface protocol are defined as links. The link includes one or more pairs of a transmission path and a reception path, in which a transmission path and a reception path forming a pair are defined as a lane. Further, the number of lanes forming one link is defined as a link width.

SUMMARY

Aspects of the present disclosure provide a memory controller capable of connecting to various connectors.

Aspects of the present disclosure also provide a method of operating a memory controller capable of connecting to various connectors.

Aspects of the present disclosure also provide a storage device including a memory controller capable of connecting to various connectors.

According to some aspects of inventive concepts, a memory controller includes a PHY module including a first PHY terminal connected to a plurality of pins of a device connector, a MAC module including a first MAC terminal that is enabled to form a first lane with the first PHY terminal, and a second MAC terminal that is disabled without being connected to the first PHY terminal, a switch controller configured to receive a signal of a host connector connected to the device connector from at least one of the plurality of pins and output a switch signal in response to the signal of the host connector, and a switch configured to disable the second MAC terminal and form the first lane by connecting the first PHY terminal to the first MAC terminal in response to the switch signal.

According to some aspects of inventive concepts, a memory controller includes a PHY module including a PHY terminal connected to a plurality of pins included in a device connector according to a type of the device connector, a MAC module including a first MAC terminal that forms a first lane with the PHY terminal and configured to transmit and receive data to and from the PHY module through the first lane, and a second MAC terminal that does not transmit and receive data to and from the PHY module, a switch controller configured to receive a signal of a host connector connected to the device connector from the plurality of pins and output a switch signal in response to the signal of the host connector, and a switch configured to form the first lane by connecting the PHY terminal to the first MAC terminal in response to the switch signal.

According to some aspects of inventive concepts, a memory controller includes a PHY module including a first PHY terminal and a second PHY terminal connected to a plurality of pins included in a device connector according to a type of the device connector, a MAC module including a first port including a plurality of first MAC terminals and a second port including a plurality of second MAC terminals, a switch controller configured to receive a connector signal indicating the number of ports of a host connector connected to the device connector and a type of the device connector from the plurality of pins, and output a switch signal in response to the connector signal, and a switch configured to form a first lane by connecting at least some of the plurality of first MAC terminals with the second PHY terminal, and/or configured to form a second lane by connecting at least some of the plurality of second MAC terminals with the second PHY terminal according to the switch signal, wherein the MAC module transmits and receives data to and from the PHY module through the first lane and/or the second lane.

According to some aspects of inventive concepts, a memory controller includes a PHY module including a first PHY terminal and a second PHY terminal connected to a plurality of pins included in a device connector according to a type of the device connector, a MAC module including a first port including a first MAC terminal and a second MAC terminal different from each other, and a second port including a third MAC terminal, the second port being different from the first port, and a switch configured to disable the third MAC terminal and form a first lane by connecting the first PHY terminal to the first MAC terminal and connecting the second PHY terminal to the second MAC terminal at a first time point, the switch being configured to disable the second MAC terminal, form the first lane by connecting the first PHY terminal to the first MAC terminal, and form the second lane by connecting the second PHY terminal to the third MAC terminal at a second time point different from the first time point.

According to some aspects of inventive concepts, a storage device includes a device connector including a plurality of pins and coupled to the host connector, a memory controller communicating with a host through the host connector and the device connector via an interface according to types of the host connector and the device connector, and a nonvolatile memory into which data is written from the host or from which data is read out to the host by the memory controller, wherein the memory controller includes a PHY module including a first PHY terminal and a second PHY terminal connected to the plurality of pins according to the type of the device connector, a MAC module including a first port including a plurality of first MAC terminals and a second port including a plurality of second MAC terminals, a switch controller configured to receive a connector signal including the number of ports of the host connector and the type of the device connector through the plurality of pins, and output a switch signal in response to the connector signal, and a switch configured to form a first lane by connecting at least some of the plurality of first MAC terminals with the first PHY terminal, and/or configured to form a second lane by connecting at least some of the plurality of second MAC terminals with the second PHY terminal according to the switch signal, wherein the MAC module is configured to transmit and receive data to and from the PHY module through the first lane and/or the second lane.

According to some aspects of inventive concepts, a method of operating a memory controller which transmits and receives data by a PHY module and a MAC module including a first port and a second port, the method includes providing a connector signal including information of a host connector connected to the device connector from a device connector connected to a PHY terminal of the PHY module, reading lane information between the PHY module and the MAC module according to the connector signal from a memory, and forming a first lane by connecting the PHY terminal with at least some of a plurality of first MAC terminals included in the first port through a switch, and forming a second lane by connecting the PHY terminal with at least some of the plurality of second MAC terminals included in the second port through the switch according to the read lane information.

However, aspects of the present disclosure are not restricted to those set forth herein. The above and other aspects of the present disclosure will become more apparent to one of ordinary skill in the art to which the present disclosure pertains by referencing the detailed description of the present disclosure given below.

BRIEF DESCRIPTION OF THE DRAWINGS

The above and other aspects and features of the present disclosure will become more apparent by describing in detail example embodiments thereof with reference to the attached drawings, in which:

FIG. 6 is a block diagram illustrating the memory of FIG. 5;

DETAILED DESCRIPTION OF EMBODIMENTS

Figure 1:
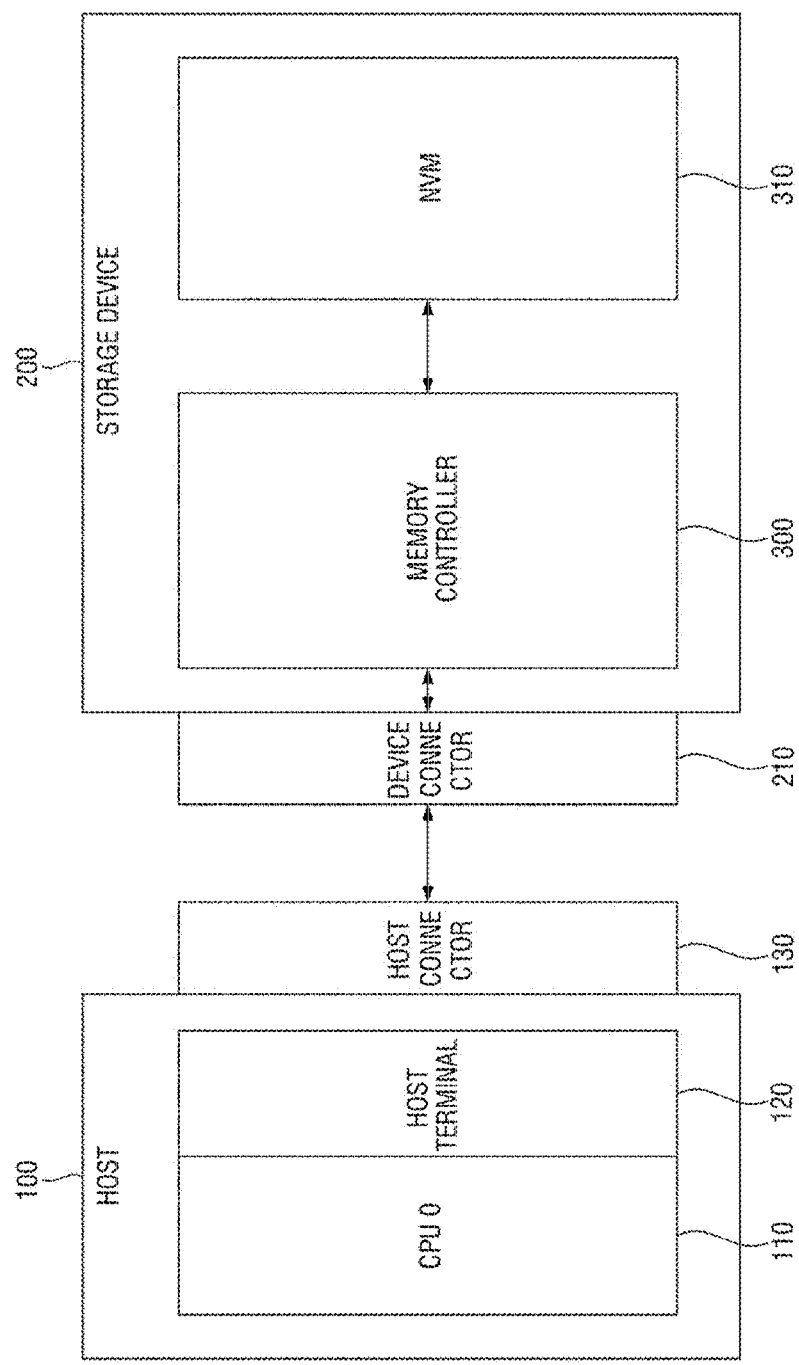
FIG. 1 is a block diagram illustrating a storage system according to some example embodiments.

FIG. 1 is a block diagram illustrating a storage system according to some example embodiments.

Referring to FIG. 1, a storage system according to some example embodiments may include a host 100 and/or a storage device 200.

The host 100 may include a central processing unit (CPU) 110, a host terminal 120, and/or a host connector 130.

The host 100 may be, for example, any electronic device such as a personal computer (PC), a laptop, a mobile phone, a smart phone, a tablet PC, an MP3 player, a personal digital assistant (PDA), an enterprise digital assistant (EDA), a portable multimedia player (PMP), a digital camera, a music player, a portable game console, a navigation device, a wearable device, an Internet of Things (IoT) device, an Internet of Everything (IoE) device, an e-book, a virtual reality (VR) device, and an augmented reality (AR) device.

The central processing unit 110 may control all operations of the host 100. The central processing unit 110 may be connected to the host terminal 120. The host terminal 120 may be connected to the host connector 130, and the central processing unit 110 may be connected to the storage device 200 through the host connector 130 and the host terminal 120. The central processing unit 110 may transmit and receive data to and from the storage device 200 according to the PCIe interface protocol through, for example, the host connector 130 and the host terminal 120.

The storage device 200 may include a device connector 210, a memory controller 300, and/or a nonvolatile memory device 310.

In some example embodiments, the storage device 200 may be a solid state drive (SSD) as a storage system according to some example embodiments. However, the present disclosure is not limited thereto, and the storage device 10 may be implemented as various types of devices such as an embedded multimedia card (eMMC), a universal flash storage (UFS) memory card, a compact flash (CF) card, a secure digital (SD) card, a micro secure digital (Micro-SD) card, a mini secure digital (Mini-SD) card, an extreme digital (xD) card or a memory stick.

The memory controller 300 may control all operations of the storage device 200. The memory controller 300 may be connected to the device connector 210. The device connector 210 may be connected to the host connector 130. The memory controller 300 may transmit and receive data according to the PCIe interface protocol through, for example, the device connector 210.

The memory controller 300 may control an operation of the nonvolatile memory device 310. For example, the memory controller 300 may write or read data in the nonvolatile memory device 310 according to a command provided from the host 100.

The nonvolatile memory device 310 may include, for example, a flash memory or a resistive memory such as a resistive RAM (ReRAM), a phase change RAM (PRAM), or a magnetic RAM (MRAM). In addition, the nonvolatile memory device 200 may include an integrated circuit including a processor and a RAM, for example, a storage device or a processing in memory (PIM).

Figure 2:
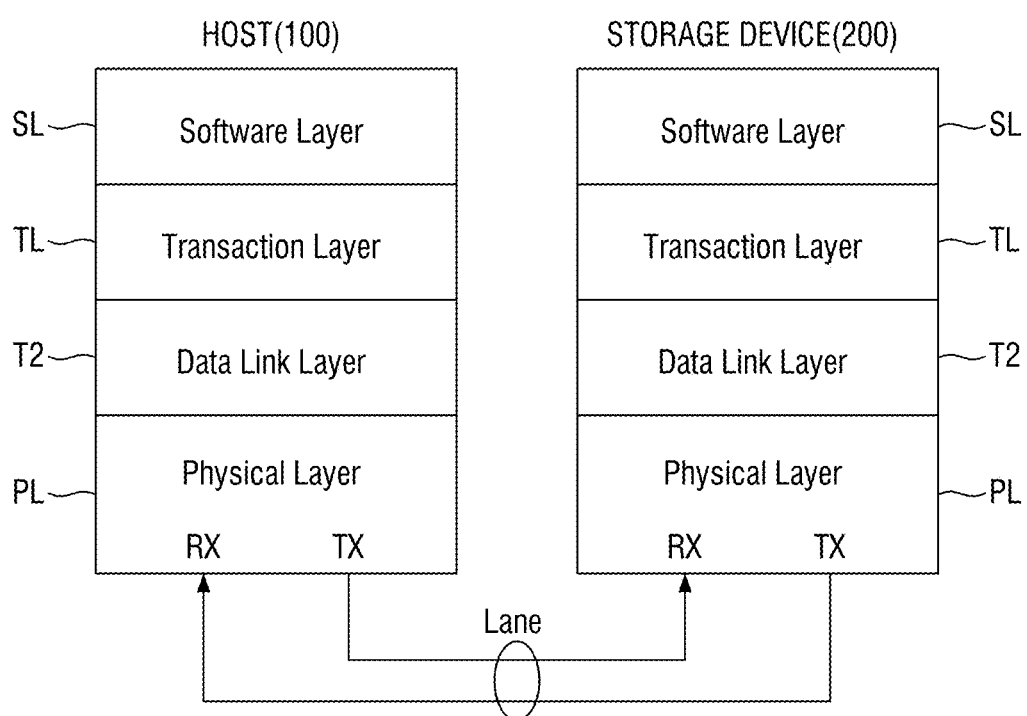
FIG. 2 is a block diagram illustrating the storage system of FIG. 1.

FIG. 2 is a block diagram illustrating the storage system of FIG. 1.

Referring to FIG. 2, a storage system according to some example embodiments may include the host 100 and/or the storage device 200. The host 100 and the storage device 200 may transmit and receive data with each other according to the PCIe interface protocol.

A PCIe architecture may include a plurality of layers including a physical layer PL, a data link layer DL, a transaction layer TL, and a software layer SL which are logically divided.

The physical layer PL corresponds to the lowest layer and serially transmits packets generated in the data link layer DL between the host 100 and the storage device 200. The physical layer PL provides a link formed through TX and RX between the PCIe devices 100 and 200, and packets are transmitted between the host 100 and the storage device 200 through the link.

The data link layer DL corresponds to an upper layer of the physical layer PL, guarantees the reliability of packet transmission through the link, and provides functions to manage the link. For example, the data link layer DL may add a sequence number, cyclic redundancy check (CRC) information, and the like to a packet generated in the transaction layer TL.

The transaction layer TL receives a read or write request from the software layer SL, generates a request packet, and delivers the request packet to the data link layer DL. In addition, the transaction layer TL receives a response packet from the data link layer DL, and matches the response packet with the request received from the software layer SL.

The software layer SL is the highest layer that is not defined by the PCIe specification, and the software layer SL may include, for example, software driving a PCIe device, or software receiving a data read or write request from a user or host application and providing a corresponding response to the user or host application.

More detailed description for the physical layer PL, the data link layer DL, the transaction layer TL and software layer SL is defined in the PCIe specification.

Figure 3:
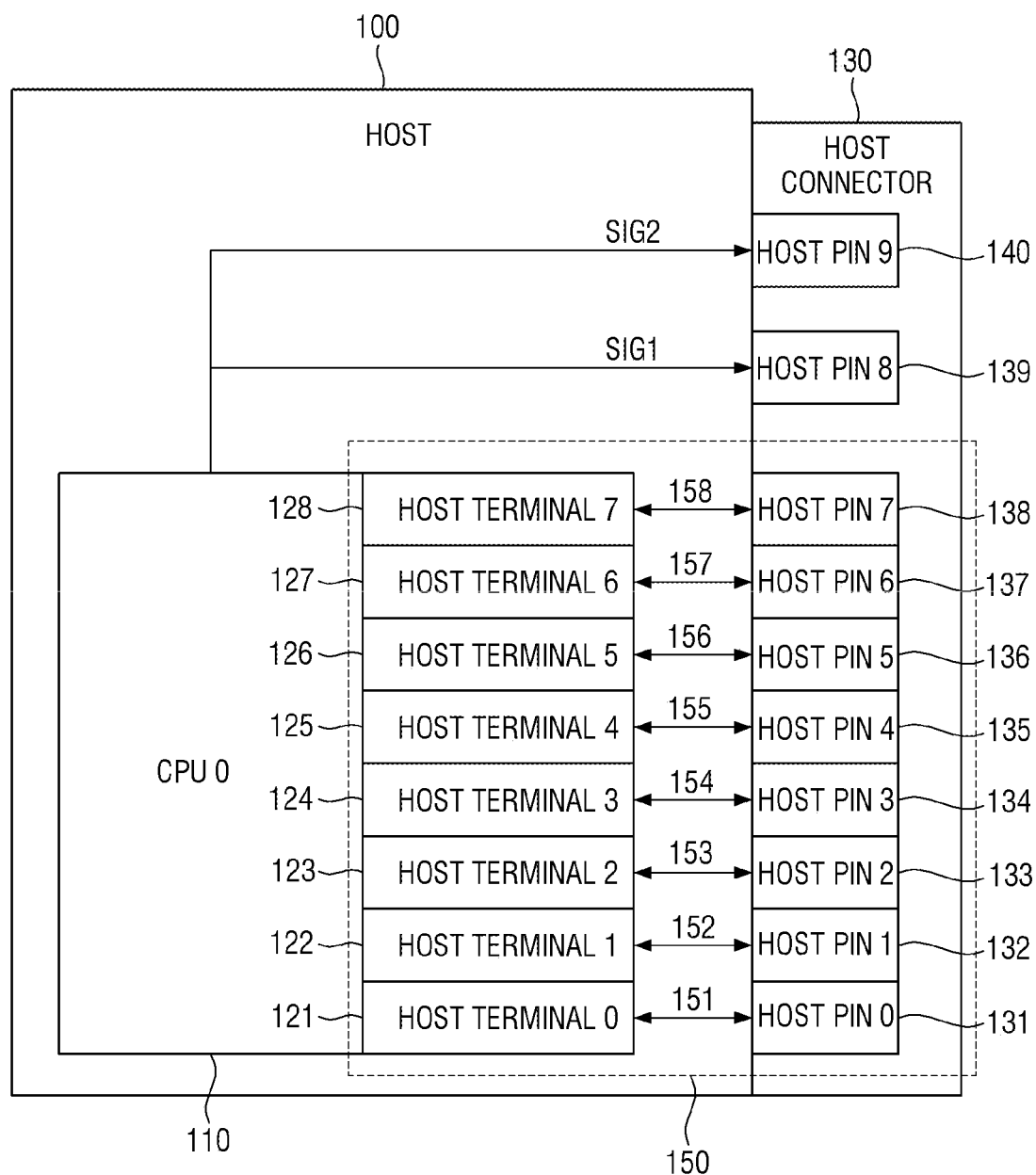
FIG. 3 is a block diagram illustrating the host of FIG. 1.

FIG. 3 is a block diagram illustrating the host of FIG. 1.

Referring to FIG. 3, the host 100 and the host connector 130 may form a host port 150. The host terminal 120 may include a plurality of host lanes 151 to 158.

For example, a plurality of host terminals 121 to 128 connected to the central processing unit 110 may form a plurality of host lanes 151 to 158 with a plurality of host single pins 131 to 138 included in the host connector 130. The host terminals 121 to 128 may form the host lanes 151 to 158 with the host single pins 131 to 138. The host lanes 151 to 158 may include a transmission path and a reception path forming a pair between the host terminals 121 to 128 and the host single pins 131 to 138.

The host terminals 121 to 128 may transmit and receive data to and from the host single pins 131 to 138 through the host lanes 151 to 158. Accordingly, the central processing unit 110 may transmit and receive data to and from an external device connected to the host connector 130 through the host port 150.

On the other hand, the host connector 130 may include the host single pins 131 to 138, a first host pin 139, and a second host pin 140.

As described above, the host single pins 131 to 138 may form the host port 150 with the host terminal 120.

The first host pin 139 may indicate the type of the host connector 130. For example, when a connector of an external device (for example, the device connector 210 of the storage device 200 of FIG. 1) is connected to the host connector 130, the first host pin 139 may transmit a first signal SIG1 indicating the type of the host connector 130 from the host 100. The type of the host connector 130 may mean, for example, a form factor of a host connector such as U.2, U.3, AIC, EDSFF, or the like.

A second host pin 140 may indicate the number of ports of the host connector 130. That is, the second host pin 140 may mean the number of the host ports 150 of the host connector 130. For example, when a connector of an external device (for example, the device connector 210 of the storage device 200 of FIG. 1) is connected to the host connector 130, the second host pin 140 may transmit a second signal SIG2 indicating the number of ports of the host connector 130 from the host 100.

The number of host ports 150 may mean the number of the host ports 150 such as, for example, a single port or a dual port. In other words, since one central processing unit 110 forms one host port 150 with the host connector 130, the number of ports of the host connector 130 may mean the number of the central processing units 110 included in the host 100. In FIG. 2, since the number of the host ports 150 is 1, the number of ports of the host connector 130 may be 1. Alternatively, since the number of the central processing units 110 in FIG. 2 is 1, the number of ports of the host connector 130 may be 1.

Figure 4:
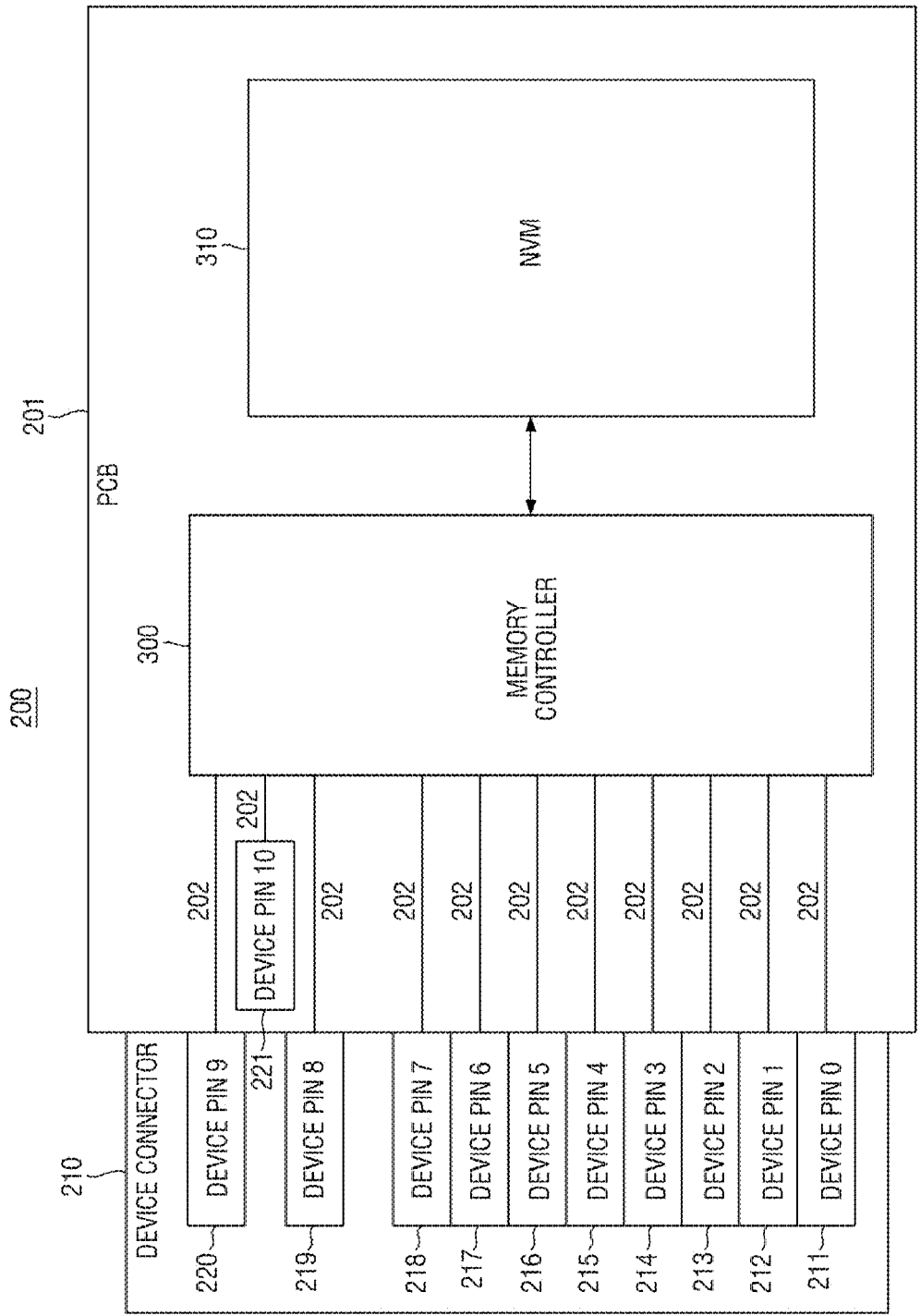
FIG. 4 is a block diagram illustrating the storage device of FIG. 1.

FIG. 4 is a block diagram illustrating the storage device of FIG. 1.

Referring to FIG. 4, the storage device 200 may include a substrate 201, the device connector 210, the memory controller 300, and/or the nonvolatile memory device 310.

The substrate 201 may be made of an insulating material such as plastic, and may be, for example, a printed circuit board (PCB). The device connector 210, the memory controller 300, and the nonvolatile memory device 310 may be mounted on the substrate 201.

The device connector 210, the memory controller 300, and the nonvolatile memory device 310 may be electrically connected to each other by wirings on the substrate 201. For example, a plurality of single pins 211 to 218, a first pin 219, a second pin 220, and a third pin 221 of the device connector 210 may be electrically connected to the memory controller 300 by a wiring 202 of the substrate 201. In the drawing, some of the wirings 202 on the substrate 201 are illustrated for simplicity of description.

The device connector 210 may be disposed on one side surface of the substrate 201, for example. Alternatively, the device connector 210 may be a portion of the substrate 201, and the device connector 210 may be formed of the same material as the substrate 201. The device connector 210 may have a shape protruding from one side surface of the substrate 101. The device connector 210 may include a plurality of pins 211 to 220. The plurality of pins 211 to 220 may include the plurality of single pins 211 to 218, the first pin 219, and the second pin 220. The plurality of single pins 211 to 218, the first pin 219, and the second pin 220 may be formed of, for example, a conductive material. Accordingly, the plurality of single pins 211 to 218, the first pin 219, and the second pin 220 may be electrically connected to pins of an external device connected to the device connector 210.

For example, the shape and form factor of the substrate 201 and the device connector 210 may comply with the Peripheral Component Interconnect Express (PCIe) standard.

Figure 5:
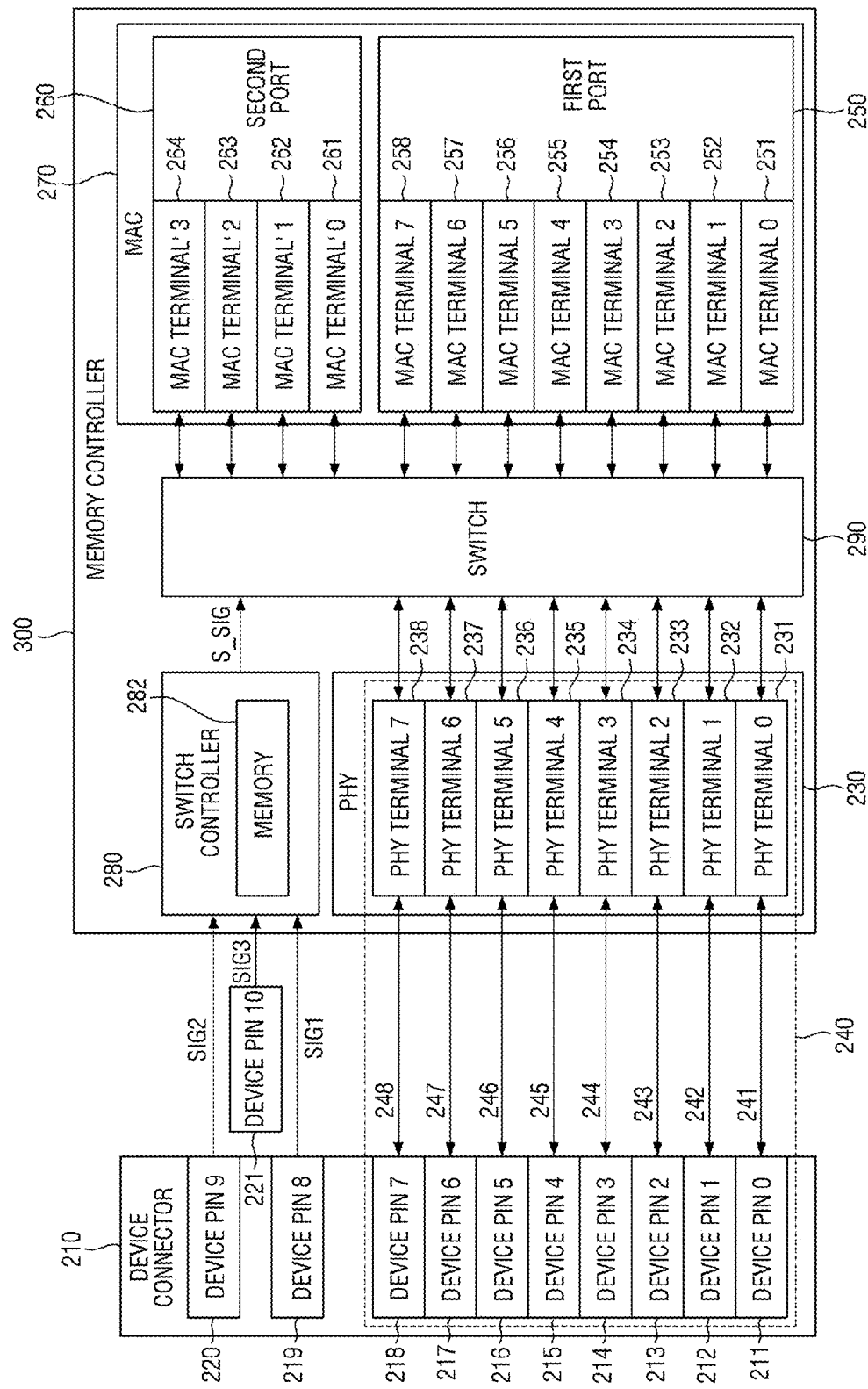
FIG. 5 is a block diagram illustrating the memory controller of FIG. 1.

FIG. 5 is a block diagram illustrating the memory controller of FIG. 1. FIG. 6 is a block diagram illustrating the memory of FIG. 5.

Referring to FIG. 5, the memory controller 300 may include a PHY module 230, a MAC module 270, a switch controller 280, and/or a switch 290.

The PHY module 230 may form a device port 240 with the device connector 210. The device port 240 may include a plurality of device lanes 241 to 248.

For example, a plurality of PHY terminals 231 to 238 included in the PHY module 230 may form the plurality of device lanes 241 to 248 with the plurality of single pins 211 to 218 included in the device connector 210. The PHY terminals 231 to 238 may form the device lanes 241 to 248 with the single pins 211 to 218. The device lanes 241 to 248 may include a transmission path and a reception path forming a pair between the PHY terminals 231 to 238 and the single pins 211 to 218.

The PHY terminals 231 to 238 may transmit and receive data to and from the single pins 211 to 218 through the device lanes 241 to 248. Accordingly, the memory controller 300 may transmit and receive data to and from an external device connected to the device connector 210 through the device port 240.

Referring to FIG. 4, the plurality of single pins 211 to 218 of the device connector 210 may be connected to the memory controller 300 by the wiring 202 on the substrate 201. That is, the plurality of single pins 211 to 218 may be connected to the plurality of PHY terminals 231 to 238 by the wiring 202 on the substrate 201. Accordingly, the device lanes 241 to 248 may be determined by the wiring 202 on the substrate 201.

The MAC module 270 may transmit and receive data to and from the PHY module 230 through a lane. The MAC module 270 may include a first port 250 including a plurality of first MAC terminals 251 to 258 and a second port 260 including a plurality of second MAC terminals 261 to 264. Although the MAC module 270 including two ports 250 and 260 is illustrated in FIG. 5, the present disclosure is not limited thereto, and the MAC module 270 may include three or more ports.

Referring to FIG. 2, the PHY module 230 may be a module of the physical layer PL. The PHY module 230 may interface the memory controller 300. That is, the memory controller 300 may transmit and receive data through the PHY module 230. In addition, the MAC module 270 may be a module of the data link layer DL. That is, the MAC module 270 may generate data to be provided through the PHY module 230 as packets.

Referring back to FIG. 5, the memory controller 300 may receive a signal of a host connector connected to the device connector 210 from at least one pin of a plurality of pins 211 to 221 of the device connector 210. The switch controller 280 may receive a signal of a host connector connected to the device connector 210 from at least one pin of a plurality of pins 211 to 221 of the device connector 210. For example, the switch controller 280 may receive a signal of a host connector from the first pin 219, the second pin 220, and the third pin 221 among the plurality of pins 211 to 221. Hereinafter, it is assumed that the switch controller 280 receives a signal of a switch connector from the first pin 219, the second pin 220, and the third pin 221, but the present disclosure is not limited thereto.

When a connector of an external device (for example, the host connector 130 of the host 100 of FIG. 1) is connected to the device connector 210, the signal of the host connector may include the type of the connector of the external device, the number of ports of the connector of the external device, and the type of the device connector 210. For example, the signal of the host connector may include the first signal SIG1, the second signal SIG2, and a third signal SIG3.

For example, the first signal SIG1 may be provided through the first pin 219. The switch controller 280 may receive the third signal SIG3 through the third pin 221. When a connector of an external device (for example, the host connector 130 of the host 100 of FIG. 1) is connected to the device connector 210, the first signal SIG1 and the third signal SIG3 may indicate the type of the connector of the external device and the type of the device connector 210. For example, the type of the connector of the external device and the type of the device connector 210 may mean form factors of the connector of the external device and the device connector 210, respectively.

The switch controller 280 may receive the second signal SIG2 through the second pin 220. When a connector of an external device (for example, the host connector 130 of the host 100 of FIG. 1) is connected to the device connector 210, the second signal SIG2 may indicate the number of ports of the connector of the external device.

The switch controller 280 may receive the first signal SIG1, the second signal SIG2, and the third signal SIG3. The switch controller 280 may determine the type of the connector of the external device, the type of the device connector 210, and the number of ports of the connector of the external device, from the first signal SIG1, the second signal SIG2, and the third signal SIG3.

For example, referring to FIG. 6, the switch controller 280 may include a memory 282 therein. The memory 282 may store the type of the connector of the external device and the number of ports of the connector of the external device according to the first signal SIG1, the second signal SIG2, and the third signal SIG3. Accordingly, the switch controller 280 may read the type of the connector of the external device and the number of ports of the connector of the external device from the memory 282.

In addition, the memory 282 may store a lane configuration between the PHY module 230 and the MAC module 270 according to the first signal SIG1, the second signal SIG2, and the third signal SIG3. Accordingly, the switch controller 280 may output a switch signal S_SIG including a lane configuration according to the first signal SIG1, the second signal SIG2, and the third signal SIG3.

Referring to FIGS. 3 and 5, the lane configuration may be configured such that the host terminals 121 to 128 of the host 100 correspond to and connect to the MAC terminals 251 to 258 and 261 to 264 of the MAC module 270. In addition, the first central processing unit 110 of the host 100 may be configured to be connected to the first port 250. For example, a lane may be configured such that the first host terminal 121 is connected to the first MAC terminal 251 of the first port 250, and a lane may be configured such that the first host terminal 122 is connected to the first MAC terminal 252 of the first port 250.

Referring back to FIG. 5, the switch 290 may be disposed between the PHY module 230 and the MAC module 270. The switch 290 may receive the switch signal S_SIG from the switch controller 280. The switch 290 may form a lane by connecting the PHY module 230 to the MAC module 270 by the switch signal S_SIG. Accordingly, the PHY module 230 and the MAC module 270 may transmit and receive data with each other.

In the drawing, although it is illustrated that the plurality of single pins 211 to 218 among the plurality of pins 211 to 221 form the device lanes 241 to 248 with the PHY terminals 231 to 238 and that the memory controller 300 receives the signal of the host connector from the first pin 219, the second pin 220, and the third pin 221 among the plurality of pins 211 to 221, the present disclosure is not limited thereto. At least one pin of the plurality of pins 211 to 221 may form a device lane with the PHY terminals 231 to 238, and the memory controller 300 may receive the signal of the host connector from at least one pin other than the pin forming the device lane among the plurality of pins 211 to 221.

Figure 7:
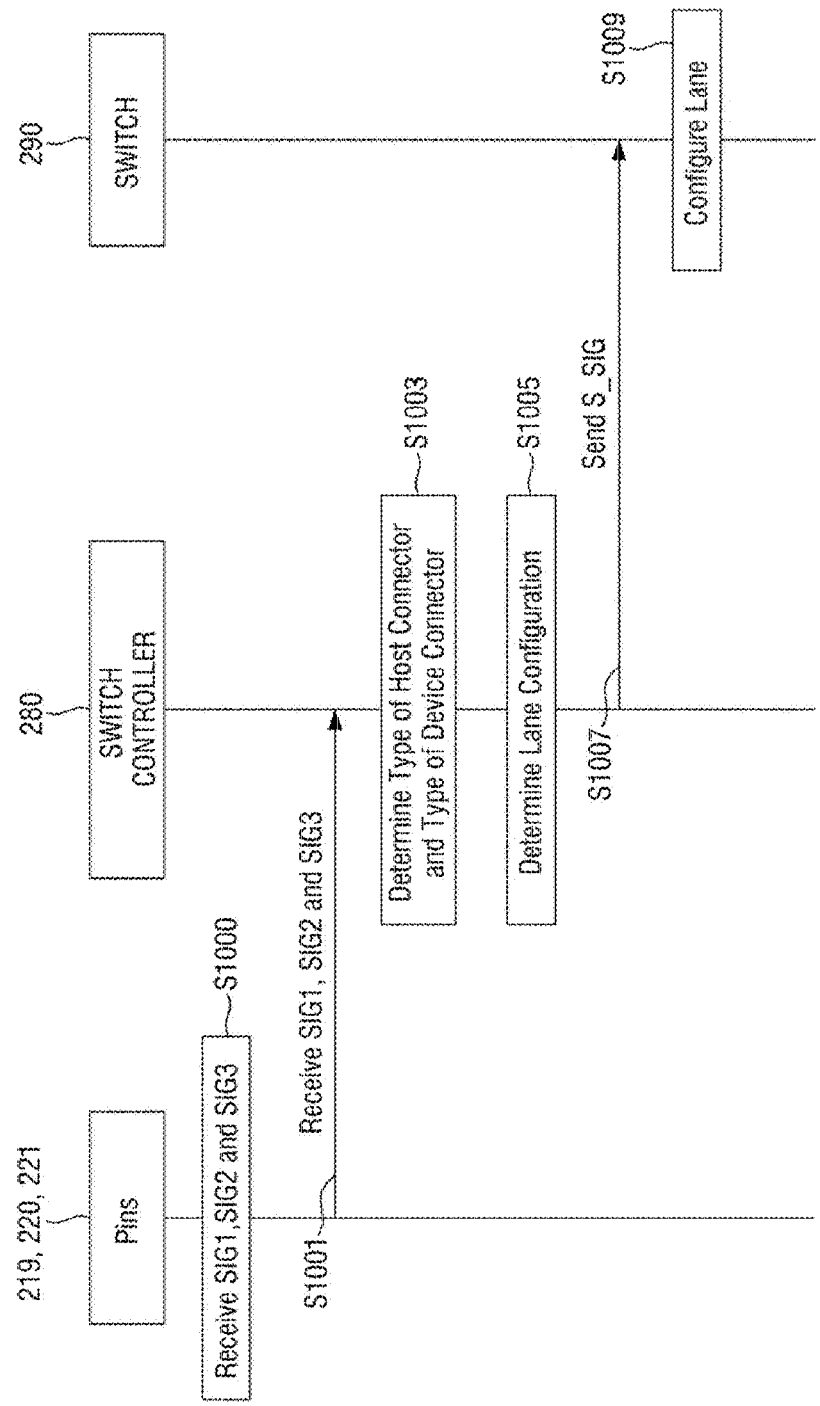
FIG. 7 is a flowchart explaining an operation of the memory controller of FIG. 5.

FIG. 7 is a flowchart explaining an operation of the memory controller of FIG. 5.

Referring to FIGS. 5 and 7, the first pin 219 may receive the first signal SIG1, the second pin 220 may receive the second signal SIG2, and the third pin 221 may receive the third signal SIG3 (operation S1000).

The first signal SIG1, the second signal SIG2, and the third signal SIG3 may be transmitted from the first pin 219, the second pin 220, and the third pin 221 to the switch controller 280 (operation S1001).

The switch controller 280 may receive the first signal SIG1, the second signal SIG2, and the third signal SIG3 (operation S1001).

The switch controller 280 may determine the type and the number of ports of the host connector 130 connected to the device connector 210 from the first signal SIG1, the second signal SIG2, and the third signal SIG3 (operation S1003). For example, the switch controller 280 may read data stored in the memory 282 to determine the type and the number of ports of the host connector 130.

The switch controller 280 may determine a lane configuration between the PHY module 230 and the MAC module 270 according to the determined type and number of ports of the host connector 130 (operation S1005). For example, the switch controller 280 may read data stored in the memory 282 to determine a lane configuration between the PHY module 230 and the MAC module 270.

The switch controller 280 may transmit, to the switch 290, the switch signal S_SIG including the determined lane configuration between the PHY module 230 and the MAC module 270 (operation S1007).

The switch 290 may configure a lane between the PHY module 230 and the MAC module 270 in response to the switch signal S_SIG (operation S1009). For example, the switch 290 may enable the PHY terminals 231 to 238 of the PHY module 230 and the MAC terminals 251 to 258 of the MAC module 270 that configure the lane, and may disable the PHY terminals 231 to 238 of the PHY module 230 and the MAC terminals 251 to 258 of the MAC module 270 that do not configure the lane. The switch 290 may form the lane by connecting the enabled PHY terminals 231 to 238 of the PHY module 230 to the enabled MAC terminals 251 to 258 of the MAC module 270. Hereinafter, it will be described in detail with reference to FIGS. 8 to 17.

FIGS. 8 to 16 are block diagrams explaining an operation of the memory controller of FIG. 5.

Figure 8:
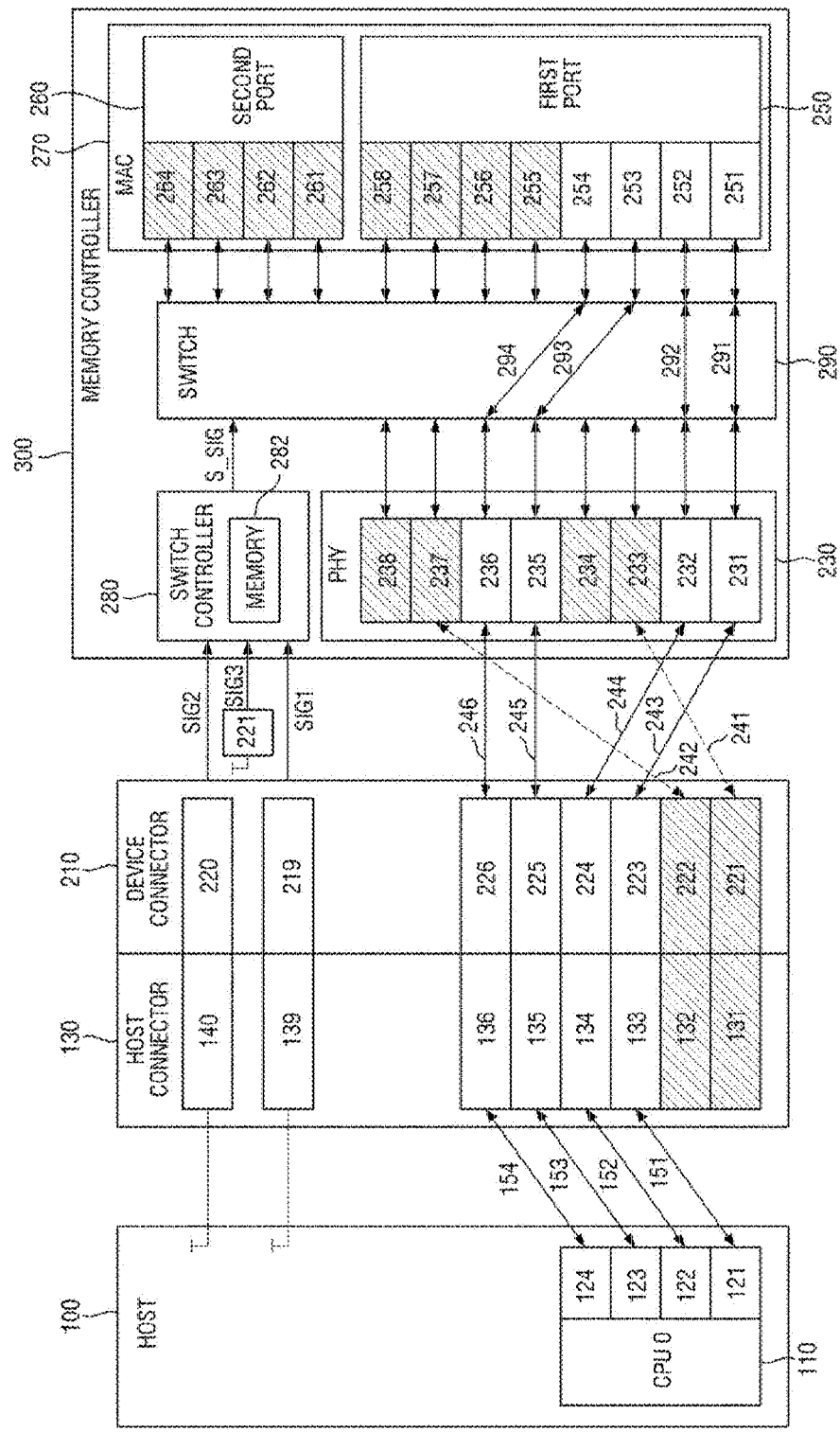
FIGS. 8 to 16 are block diagrams explaining an operation of the memory controller of FIG. 5.

Referring to FIG. 8, the host 100 may include a first central processing unit 110. The first central processing unit 110 may be connected to the first host terminals 121 to 124.

The first host terminals 121 to 124 may form a first host port with host single pins 133 to 136 of the host connector 130. The first host port may include the host lanes 151 to 154 connecting the first host terminals 121 to 124 to the host single pins 133 to 136. For example, the host lane #0 151 may include a transmission path and a reception path between the host terminal #0 121 and the host single pin #3 133.

Accordingly, as illustrated in FIG. 8, the host connector 130 may include a first host port constituted with the four host lanes 151 to 154. That is, the host connector 130 may be a single port including four lanes.

The single pins 221 to 226 included in the device connector 210 may form a device port with the PHY terminals 231 to 238 of the PHY module 230. The device port may include the device lanes 241 to 246 including transmission paths and reception paths between the single pins 133 to 136 and the PHY terminals 231 to 233 and 235 to 237. For example, the device lane #0 241 may include a transmission path and a reception path between the single pin #0 221 and the PHY terminal #2 233. This may be formed by the wiring 202 on the substrate 201, as illustrated in FIG. 4.

The first host pin 139 may be connected to the first pin 219 of the device connector 210. The first host pin 139 may have a first logic level. The first logic level may be, for example, 1. The first pin 219 may transmit the first signal SIG1 including the first logic level from the first host pin 139 to the switch controller 280.

The second host pin 140 may be connected to the second pin 220 of the device connector 210. The second host pin 140 may have the first logic level. The second pin 220 may transmit the second signal SIG2 including the first logic level from the second host pin 140 to the switch controller 280.

The third pin 221 may have the first logic level. The third pin 221 may transmit the third signal SIG3 including the first logic level to the switch controller 280.

Referring to FIG. 6, the switch controller 280 may read the memory 282 and determine that the host connector 130 is a single port and a U.2 type from the first signal SIG1, the second signal SIG2, and the third signal SIG3.

The switch controller 280 may transmit, to the switch 290, the switch signal S_SIG including a lane configuration c according to the determined type and number of ports of the host connector 130. The switch 290 may enable or disable the PHY terminals 231 to 238 and the MAC terminals 251 to 258 and 261 to 264 according to the switch signal S_SIG. The switch 290 may enable the PHY terminals 231, 232, 235, and 236 connected to the host single pins 133 to 136, and disable the PHY terminals 231 to 238 not connected to the host single pins 133 to 136. In addition, the switch 290 may disable the PHY terminals 233, 234, 237, and 238 that do not form the device lanes 241 to 246 with the host single pins 133 to 136.

For example, since the single pin #0 221 is not connected to the host single pin 131, the PHY terminal #2 233 forming the device lane #0 241 with the single pin #0 221 may be disabled. Since the single pin #2 222 is connected to the host single pin 132, the PHY terminal #0 231 forming the device lane #3 242 with the single pin #2 222 may be enabled. Since the PHY terminal #2 233 does not form the device lanes 241 to 246 with the single pins 221 to 226, the PHY terminal #2 233 may be disabled.

The term "disable" as used herein may mean a state in which no lane is formed. Alternatively, the term "disable" may mean a state in which data is not transmitted/received through the lane, and data is not outputted although data is inputted. The term "enable" may mean a state in which a lane is formed and data is transmitted/received through the lane. That is, when data is inputted, the term "enable" may mean a state in which output data exists.

Since the host connector 130 is a single port, the PHY module 230 may form first lanes 291 to 294 with the first port 250 of the MAC module 270. Accordingly, the second MAC terminals 261 to 264 included in the second port 260 of the MAC module 270 may be disabled.

The switch 290 may configure the first lanes 291, 292, 293, and 294 between the enabled PHY terminals 231, 232, 235, and 236 and the enabled first MAC terminals 251, 252, 253, and 254. For example, the PHY terminal #0 231 may form the lane #0 291 of the first lanes with the MAC terminal #0 251 of the first MAC terminals of the first port 250.

Accordingly, the first host terminal 121 of the host 100 may be connected to the first MAC terminal 251 of the MAC module 270 through the first host lane 151, the device lane 243, and the first lane 291. That is, the first host terminals 121 to 124 of the host 100 may be connected to the corresponding second MAC terminals 251 to 254 of the first port 250, respectively.

As previously described with reference to FIG. 4, the memory controller 300 may be configured as a single chip, and may be mounted on the substrate 201. In some example embodiments, the memory controller 300 may be connected to the device connector 210 by the wiring 202 on the substrate 201. That is, the device lanes 241 to 248 between the PHY module 230 of the memory controller 300 and the device connector 210 may be determined by the wiring 202 on the substrate 201. Accordingly, when the type of the host connector 130 or the device connector 210 is changed, the configuration of the device lanes 241 to 248 between the PHY module 230 of the memory controller 300 and the device connector 210 is changed. Accordingly, the configuration of the first lanes 291 to 294 between the PHY module 230 and the MAC module 270 also needs to be changed. Accordingly, when the type of the host connector 130 or the device connector 210 is changed, a manufacturer needs to design a new memory controller.

On the other hand, the memory controller 300 according to some example embodiments may include the switch 290 therein, and the configuration of the first lanes 291 to 294 between the PHY module 230 and the MAC module 270 may be changed by the switch 290. Accordingly, in the memory controller 300 according to some example embodiments, although the type of the host connector 130 or the device connector 210 is changed, the configuration of the first lanes 291 to 294 between the PHY module 230 and the MAC module 270 is changed by the switch 290, and thus there is no need to design a new memory controller.

In addition, since the configuration of the first lanes 291 to 294 between the PHY module 230 and the MAC module 270 is changed by the internal switch 290, a separate element is not needed.

In addition to the type of the host connector 130 or the device connector 210 stored in the memory 282, a new connector type or a multi-port such as a dual port or more may emerge. In some example embodiments, the manufacturer may store a lane configuration between the PHY module 230 and the MAC module 270 according to the type and number of ports of the new connector in the memory 282 without having to design a new memory controller from the beginning. Accordingly, the memory controller may be manufactured more conveniently.

When a lane is formed but data is actually not transmitted or received through the lane, it may affect the lane that actually transmits and receives data. Accordingly, a malfunction may occur in the lane that actually transmits and receives data.

However, the PHY terminals 233, 234, 237, and 238 and the MAC terminals 255 to 258 and 261 to 264 that do not form the first lanes 291 to 294 according to some example embodiments are disabled by the switch 290. That is, no lane is formed between the disabled PHY terminals 233, 234, 237, and 238 and the disabled MAC terminals 255 to 258 and 261 to 264. Accordingly, since unused lanes are not formed, a malfunction of the first lanes 291 to 294 being used may be prevented or reduced.

Figure 9:
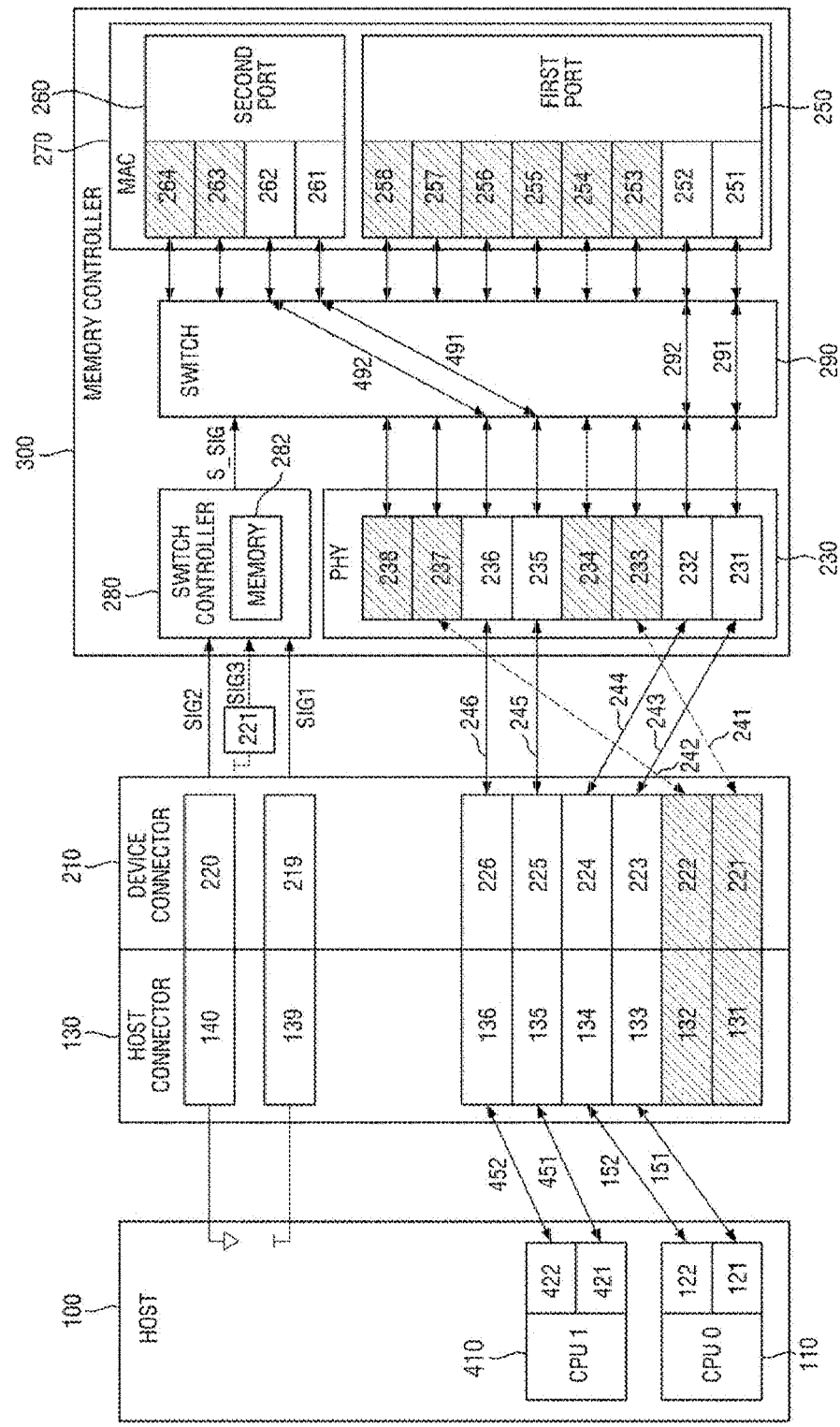

FIG. 9 is a block diagram explaining an operation of the memory controller of FIG. 5. For simplicity of description, differences from FIG. 8 will be mainly described.

Referring to FIG. 9, the host 100 may include a first central processing unit 110 and a second central processing unit 410. The first central processing unit 110 may be connected to the first host terminals 121 and 122, and the second central processing unit 410 may be connected to second host terminals 421 and 422. The number of first host terminals 121 and 122 to which the first central processing unit 110 is connected may be the same as the number of second host terminals 421 and 422 to which the second central processing unit 410 is connected.

The first host terminals 121 and 122 may form a first host port with the host single pins 133 and 134 of the host connector 130. The first host port may include the first host lanes 151 and 152 connecting the first host terminals 121 and 122 to the host single pins 133 and 134.

The second host terminals 421 and 422 may form a second host port with the host single pins 135 and 136 of the host connector 130. The second host port may include second host lanes 451 and 454 connecting the second host terminals 421 and 422 to the host single pins 135 and 136.

Accordingly, as illustrated in FIG. 9, the host connector 130 may include a first host port constituted with the two first host lanes 151 and 152 and a second host port constituted with the two second host lanes 451 and 454. That is, the host connector 130 may be a dual port including two lanes.

The single pins 221 to 226 included in the device connector 210 may form a device port with the PHY terminals 231 to 238 of the PHY module 230. The same device port as illustrated in FIG. 8 may be formed.

The first pin 219 may transmit the first signal SIG1 including the first logic level from the first host pin 139 to the switch controller 280.

The second pin 220 may transmit the second signal SIG2 including the second logic level from the second host pin 140 to the switch controller 280. The second logic level may be, for example, 0.

The third pin 221 may transmit the third signal SIG3 including the first logic level to the switch controller 280.

Referring to FIG. 6, the switch controller 280 may read the memory 282 and determine that the host connector 130 is a dual port and a U.2 type from the first signal SIG1, the second signal SIG2, and the third signal SIG3.

The switch controller 280 may transmit, to the switch 290, the switch signal S_SIG including a lane configuration g according to the determined type and number of ports of the host connector 130. The switch 290 may enable or disable the PHY terminals 231 to 238 and the MAC terminals 251 to 258 and 261 to 264 according to the switch signal S_SIG.

Since the host connector 130 is a dual port, the PHY module 230 may form the first lanes 291 and 292 with the first port 250 of the MAC module 270, and second lanes 491 and 492 with the second port 260. The number of first lanes 291 and 292 may be the same as the number of second lanes 491 and 492.

The switch 290 may configure the first lanes 291 and 292 between the PHY terminals 231 and 232 connected to the first host terminals 121 and 122, and the first MAC terminals 251 and 252 of the first port 250. Accordingly, the first central processing unit 110 may be connected to the first port 250 and may recognize a storage device connected to the host connector 130.

The switch 290 may configure the second lanes 491 and 492 between the PHY terminals 235 and 236 connected to the second host terminals 421 and 422, and the second MAC terminals 261 and 262 of the second port 260. Accordingly, the second central processing unit 410 may be connected to the second port 260 and may recognize a storage device connected to the host connector 130. The first central processing unit 110 and the second central processing unit 410 may be recognized as being connected to separate storage devices, respectively.

In addition, the first host terminals 121 and 122 of the host 100 may be connected to the corresponding first MAC terminals 251 and 252 of the first port 250, respectively, and the second host terminal 421 and 422 of the host 100 may be connected to the second MAC terminals 261 and 262 of the second port 260. The first central processing unit 110 may be connected to the first port 250, and the second central processing unit 410 may be connected to the second port 260.

Referring to FIGS. 8 and 9, the host connector 130 of a single port U.2 type as illustrated in FIG. 8 may be connected to the device connector 210 at a first time point. Thereafter, the host connector 130 is removed, and a host connector 130 of a dual port U.2 type as illustrated in FIG. 9 may be connected to the device connector 210 at a second time point. Although the number of ports of the host connector 130 is changed, the lane configuration between the PHY module 230 and the MAC module 270 may be changed by the switch 290. That is, the MAC terminals 251, 252, 261 and 262 configuring the lanes 291 to 294, 491, and 492 with the PHY terminals 231, 232, 235, and 236 may be changed. Accordingly, the host connector 130 and the device connector 210 may be normally connected.

For example, the PHY terminal #5 235 may form the first lane 293 with the MAC terminal #2 253 of the first MAC terminals 251 to 258 of the first port 250 at the first time point. The PHY terminal #5 235 may form the second lane 293 with the MAC terminal #0 261 of the second MAC terminals 261 to 264 of the second port 260 at the second time point. In addition, the number of first lanes 291 and 292 at the first time point may be different from the number of first lanes 291 and 292 at the second time point. The number of first lanes 291 to 294 at the first time point may be equal to the sum of the number of first lanes 291 and 292 and the number of second lanes 491 and 492 at the second time point.

Figure 10:
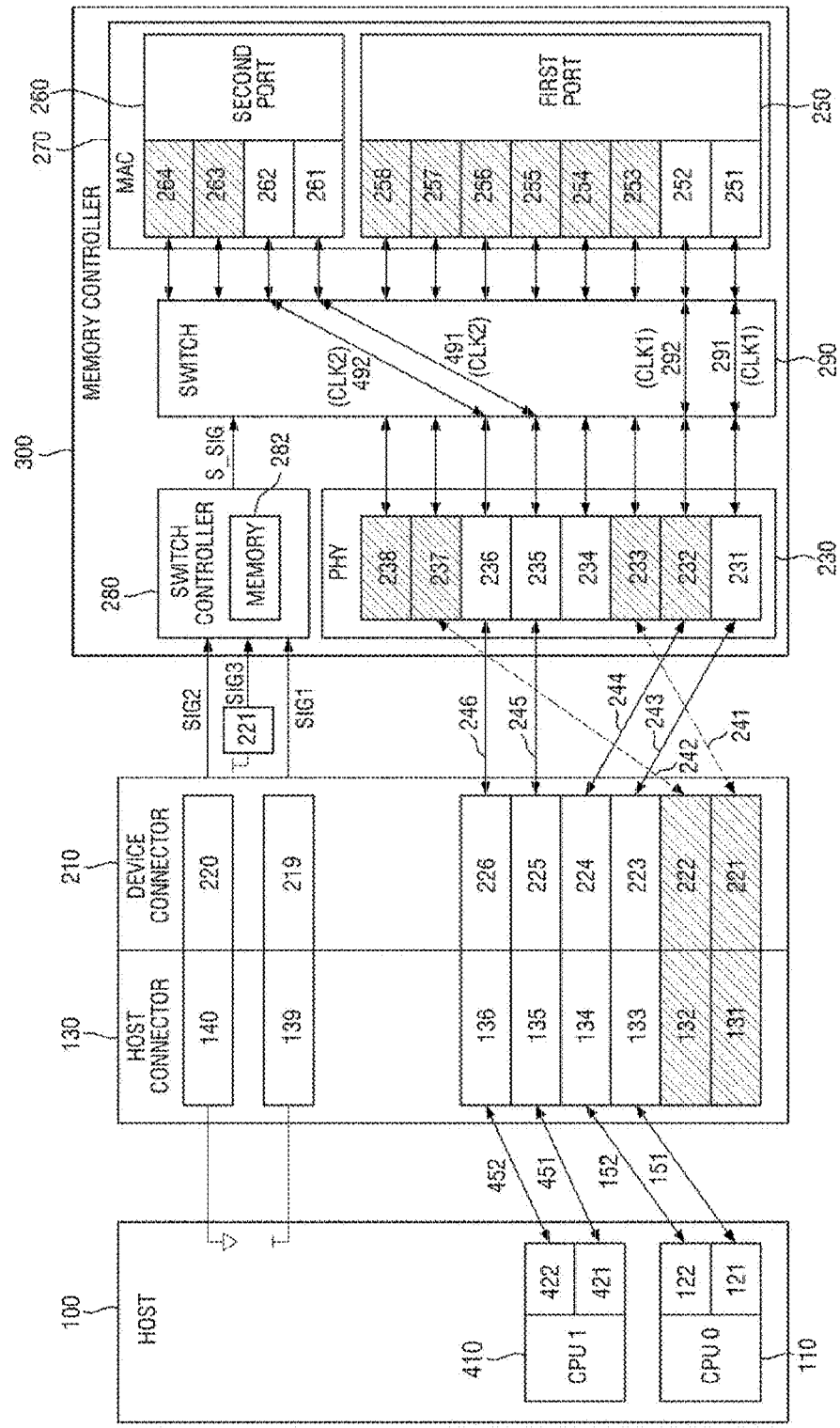

FIG. 10 is a block diagram explaining an operation of the memory controller of FIG. 9.

Referring to FIG. 10, the first central processing unit 110 may be connected to the first port 250 of a MAC module 270, and the second central processing unit 410 may be connected to the second port 260 of the MAC module 270. The first central processing unit 110 may transmit and receive data to and from a nonvolatile memory device with each other through the first port 250, and the second central processing unit 410 may transmit and receive data to and from the nonvolatile memory device with each other through the second port 260.

The PHY module 230 may generate a first system clock CLK1 and a second system clock CLK2 different from each other. The PHY module 230 may provide the first system clock CLK1 to the first port 250 through the first lanes 291 and 292. The PHY module 230 may provide the second system clock CLK2 to the second port 260 through the second lanes 491 and 492. Accordingly, the first port 250 and the second port 260 may be driven according to the different system clocks CLK1 and CLK2. The first port 250 and the second port 260 may be driven separately from each other.

Accordingly, the time point at which the PHY module 230 transmits and receives data to and from the first port 250 through the first lanes 291 and 292 may be different from the time point at which the PHY module 230 transmits and receives data to and from the second port 260 through the second lanes 491 and 492.

Figure 11:
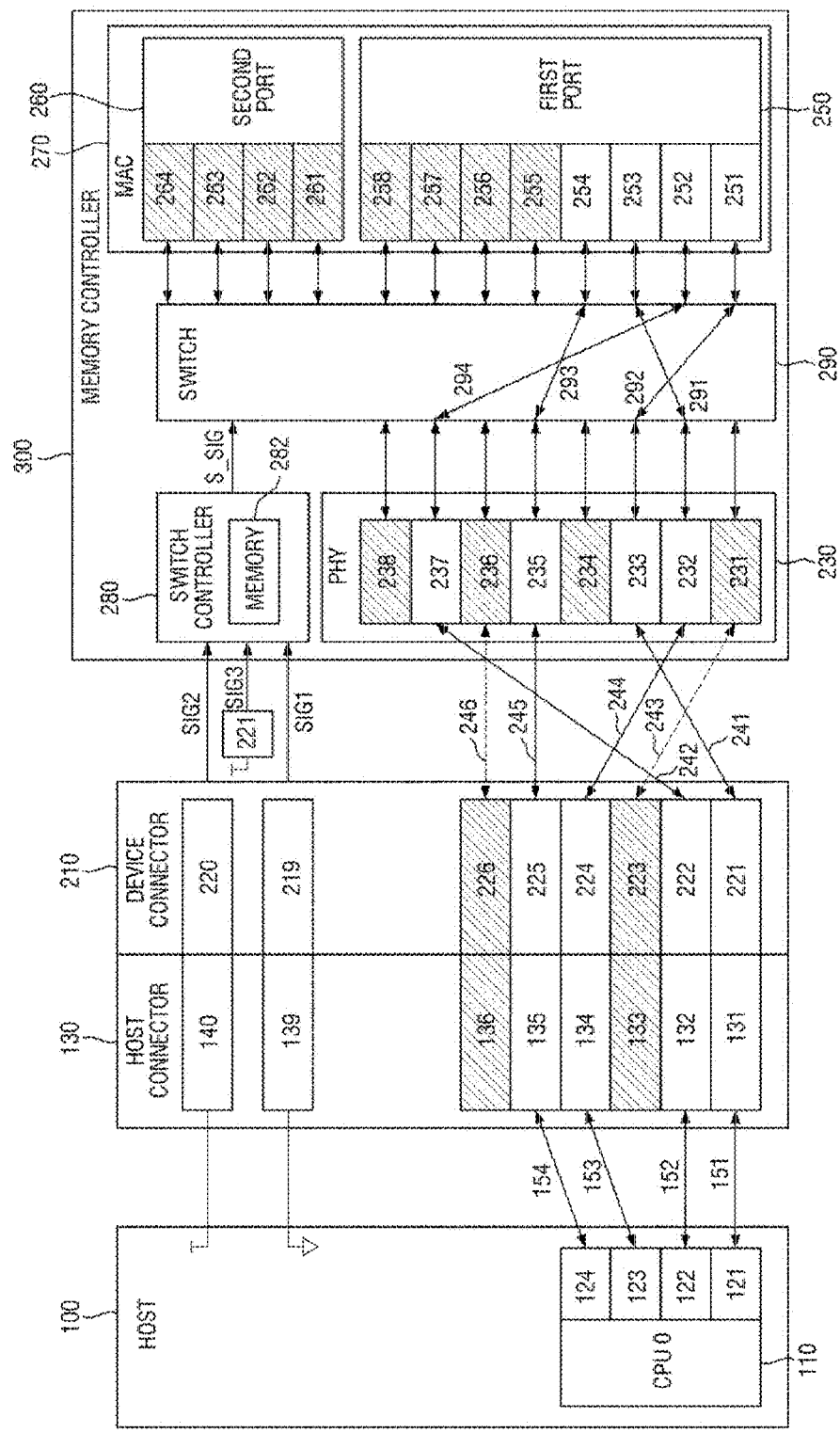

FIG. 11 is a block diagram explaining an operation of the memory controller of FIG. 5. For simplicity of description, differences from FIG. 8 will be mainly described.

Referring to FIG. 11, the first host terminals 121, 122, 123, and 124 may form a first host port with the host single pins 131, 132, 134, and 135 of the host connector 130. The first host port may include the first host lanes 151 to 154 connecting the first host terminals 121, 122, 123, and 124 and the host single pins 131, 132, 134, and 135.

As illustrated in FIG. 11, the host connector 130 may include the first host constituted with the four first host lanes 151 to 154. That is, the host connector 130 may be a single port including four lanes.

The single pins 221, 222, 224, and 225 included in the device connector 210 may form a device port with the PHY terminals 232, 233, 235, and 237 of the PHY module 230.

The first pin 219 may transmit the first signal SIG1 including the second logic level from the first host pin 139 to the switch controller 280. The second pin 220 may transmit the second signal SIG2 including the first logic level from the second host pin 140 to the switch controller 280. The third pin 221 may transmit the third signal SIG3 including the first logic level to the switch controller 280.

Referring to FIG. 6, the switch controller 280 may read the memory 282 and determine that the host connector 130 is a single port and a U.3 type from the first signal SIG1, the second signal SIG2, and the third signal SIG3.

The switch controller 280 may transmit, to the switch 290, the switch signal S_SIG including a lane configuration d according to the determined type and number of ports of the host connector 130. Accordingly, the PHY terminals 231, 234, 236, and 238, the first MAC terminals 251 to 254, and the second MAC terminals 261 to 264 may be disabled, and the PHY terminals 232, 233, 235, and 237 and the first MAC terminals 251 to 254 may be enabled. The enabled PHY terminals 232, 233, 235, 237 and the enabled first MAC terminals 251 to 254 may form the first lanes 291 to 294.

Figure 12:
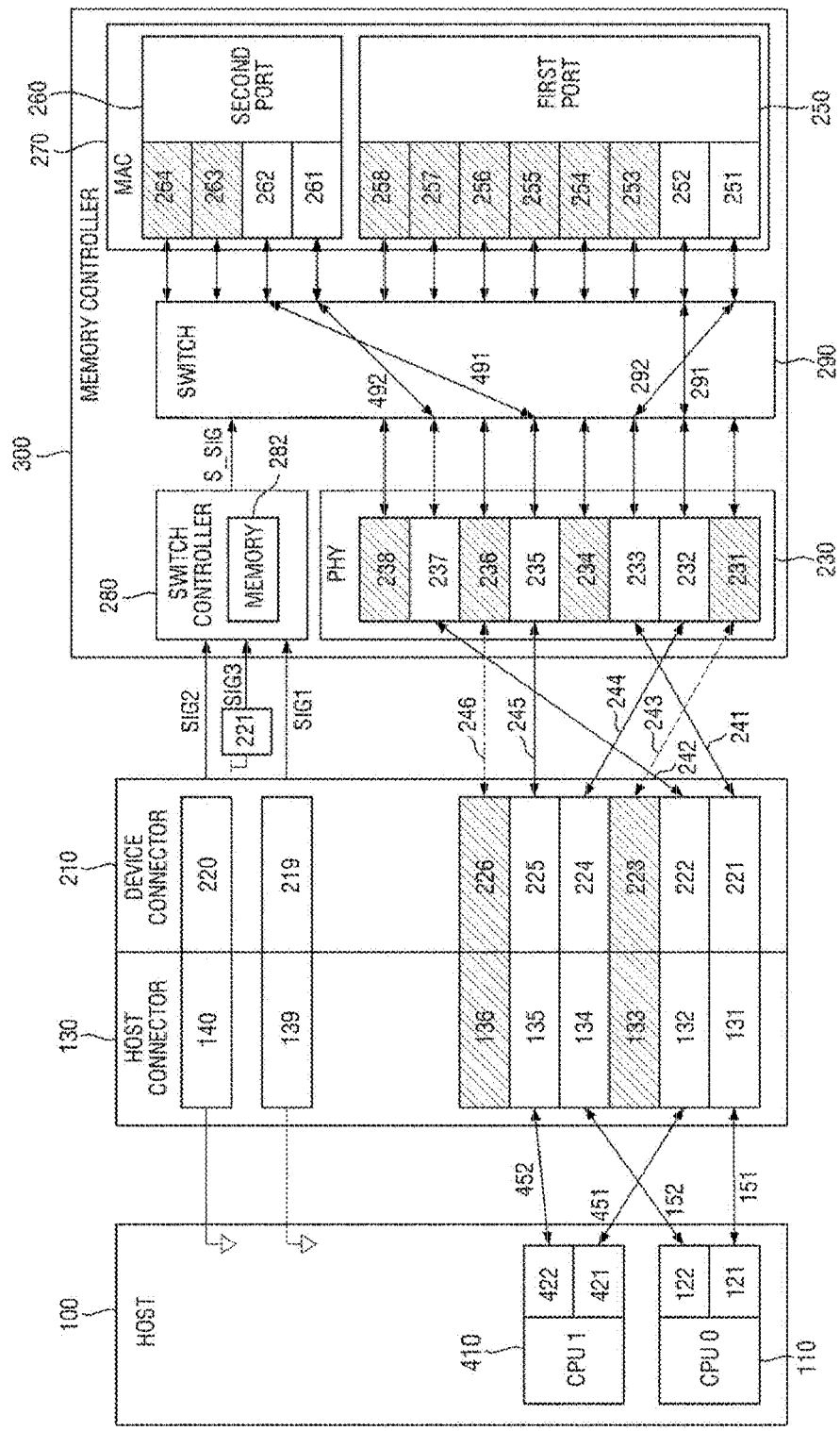

FIG. 12 is a block diagram explaining an operation of the memory controller of FIG. 5. For simplicity of description, differences from FIG. 11 will be mainly described.

Referring to FIG. 12, the host 100 may further include a second central processing unit 410. The first central processing unit 110 may be connected to the first host terminals 121 and 122, and the second central processing unit 410 may be connected to second host terminals 421 and 422.

The first host terminals 121 and 122 may form a first host port with the host single pins 133 and 134 of the host connector 130. The first host port may include the first host lanes 151 and 152 connecting the first host terminals 121 and 122 to the host single pins 133 and 134.

The second host terminals 421 and 422 may form a second host port with the host single pins 135 and 136 of the host connector 130. The second host port may include second host lanes 451 and 454 connecting the second host terminals 421 and 422 to the host single pins 135 and 136.

The first pin 219 may transmit the first signal SIG1 including the second logic level from the first host pin 139 to the switch controller 280. The second pin 220 may transmit the second signal SIG2 including the second logic level from the second host pin 140 to the switch controller 280. The third pin 221 may transmit the third signal SIG3 including the first logic level to the switch controller 280.

Referring to FIG. 6, the switch controller 280 may read the memory 282 and determine that the host connector 130 is a single port and a U.3 type from the first signal SIG1, the second signal SIG2, and the third signal SIG3.

The switch controller 280 may transmit the switch signal S_SIG including a lane configuration h according to the determined type and number of ports of the host connector 130, to the switch 290. Accordingly, the PHY terminals 231, 234, 236, and 238, the first MAC terminals 253 to 258, and the second MAC terminals 263 and 264 may be disabled, and the PHY terminals 232, 233, 235, and 237, the first MAC terminals 251 and 252, and the second MAC terminals 261 and to 262 may be enabled. The enabled PHY terminals 232 and 233 and the enabled first MAC terminals 251 and 252 may form the first lanes 291 and 292. The enabled PHY terminals 235 and 237 and the enabled second MAC terminals 261 and 262 may form the second lanes 491 and 492.

Figure 13:
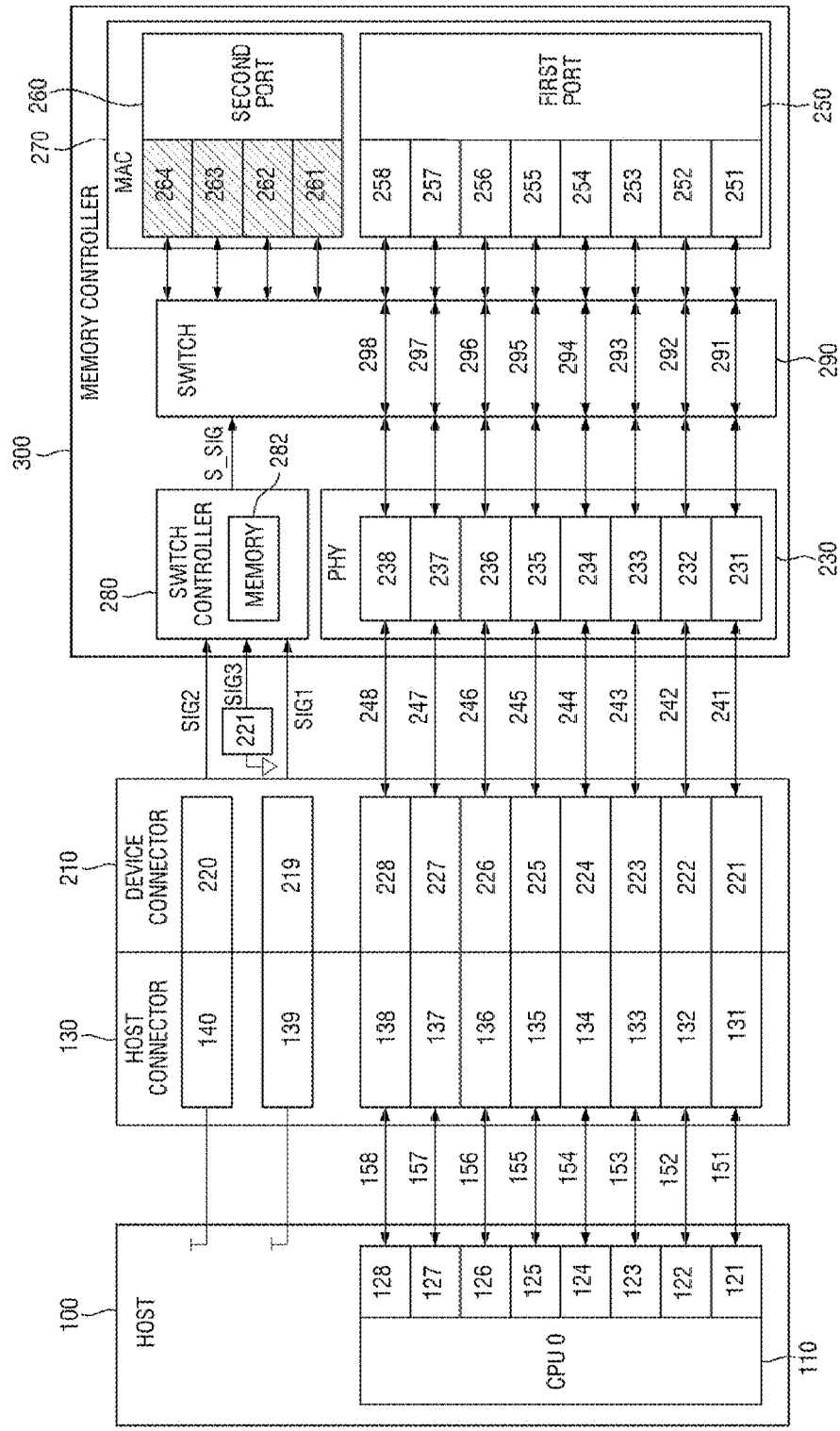

FIG. 13 is a block diagram explaining an operation of the memory controller of FIG. 5. For simplicity of description, differences from FIG. 8 will be mainly described.

Referring to FIG. 13, the first central processing unit 110 may be connected to first host terminals 121 to 128. The first host terminals 121 to 128 may form a first host port with host single pins 131 to 138 of the host connector 130. The first host port may include the first host lanes 151 to 158 connecting the first host terminals 121 to 128 to the host single pins 131 to 138.

The first pin 219 may transmit the first signal SIG1 including the first logic level from the first host pin 139 to the switch controller 280. The second pin 220 may transmit the second signal SIG2 including the first logic level from the second host pin 140 to the switch controller 280. The third pin 221 may transmit the third signal SIG3 including the second logic level to the switch controller 280.

Referring to FIG. 6, the switch controller 280 may read the memory 282 and determine that the host connector 130 is a single port and an AIC type from the first signal SIG1, the second signal SIG2, and the third signal SIG3.

The switch controller 280 may transmit, to the switch 290, the switch signal S_SIG including a lane configuration a according to the determined type and number of ports of the host connector 130. Accordingly, the second MAC terminals 261 to 264 may be disabled, and the PHY terminals 231 to 238 and the first MAC terminals 251 to 258 may be enabled. The enabled PHY terminals 231 to 238 and the enabled first MAC terminals 251 to 258 may form the first lanes 291 to 298.

Figure 14:
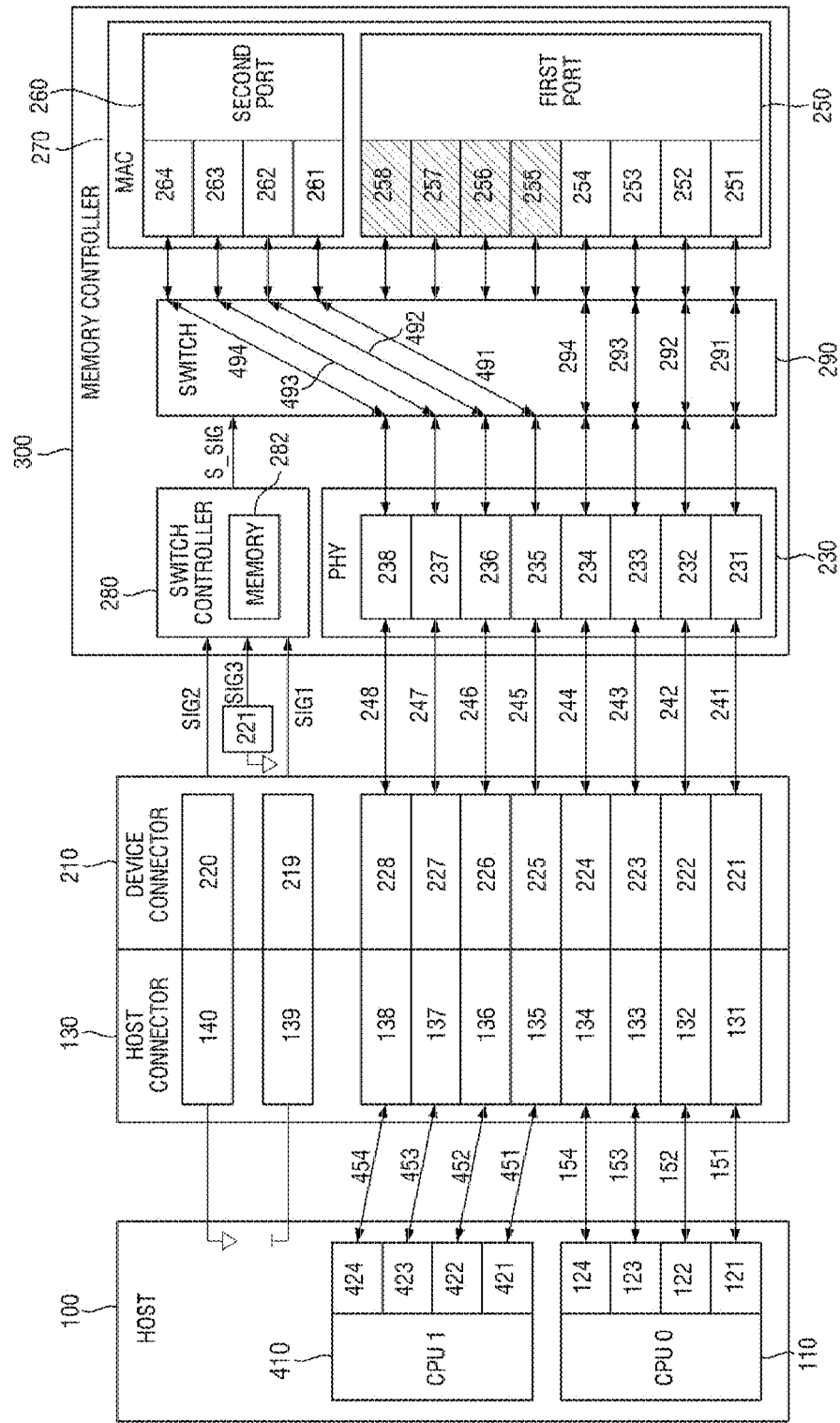

FIG. 14 is a block diagram explaining an operation of the memory controller of FIG. 5. For simplicity of description, differences from FIG. 13 will be mainly described.

Referring to FIG. 14, the first host terminals 121 to 124 may form a first host port with the host single pins 131 to 134 of the host connector 130. The first host port may include the first host lanes 151 to 154 connecting the first host terminals 121 to 124 to the host single pins 131 to 134.

The second host terminals 421 to 424 may form a second host port with the host single pins 135 to 138 of the host connector 130. The second host port may include the second host lanes 451 to 454 connecting the second host terminals 421 to 424 and the host single pins 135 to 138.

The first pin 219 may transmit the first signal SIG1 including the first logic level from the first host pin 139 to the switch controller 280. The second pin 220 may transmit the second signal SIG2 including the second logic level from the second host pin 140 to the switch controller 280. The third pin 221 may transmit the third signal SIG3 including the second logic level to the switch controller 280.

Referring to FIG. 6, the switch controller 280 may read the memory 282 and determine that the host connector 130 is a single port and an AIC type from the first signal SIG1, the second signal SIG2, and the third signal SIG3.

The switch controller 280 may transmit, to the switch 290, the switch signal S_SIG including a lane configuration e according to the determined type and number of ports of the host connector 130. Accordingly, the first MAC terminals 255 to 258 may be disabled, and the PHY terminals 231 to 238, the first MAC terminals 251 to 254, and the second MAC terminals 261 to 264 may be enabled. The enabled PHY terminals 231 to 234 and the enabled first MAC terminals 251 to 254 may form the first lanes 291 to 294. The enabled PHY terminals 235 to 238 and the enabled second MAC terminals 261 to 264 may form the second lanes 491 to 494.

Figure 15:
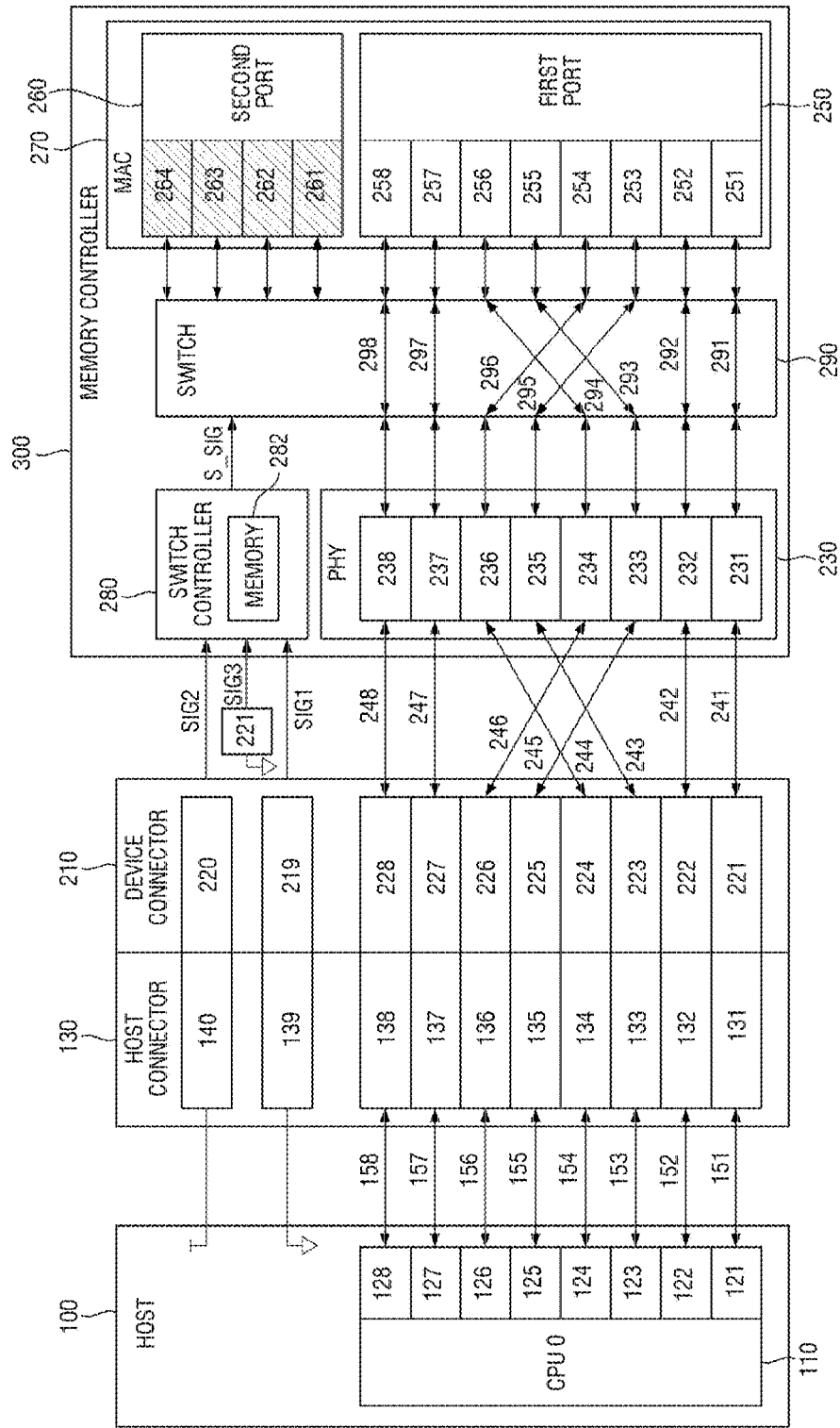

FIG. 15 is a block diagram explaining an operation of the memory controller of FIG. 5. For simplicity of description, differences from FIG. 8 will be mainly described.

Referring to FIG. 15, the first central processing unit 110 may be connected to first host terminals 121 to 128. The first host terminals 121 to 128 may form a first host port with host single pins 131 to 138 of the host connector 130. The first host port may include the first host lanes 151 to 158 connecting the first host terminals 121 to 128 to the host single pins 131 to 138.

The first pin 219 may transmit the first signal SIG1 including the second logic level from the first host pin 139 to the switch controller 280. The second pin 220 may transmit the second signal SIG2 including the first logic level from the first host pin 140 to the switch controller 280. The third pin 221 may transmit the third signal SIG3 including the second logic level to the switch controller 280.

Referring to FIG. 6, the switch controller 280 may read the memory 282 and determine that the host connector 130 is a single port and an EDSFF type from the first signal SIG1, the second signal SIG2, and the third signal SIG3.

The switch controller 280 may transmit, to the switch 290, the switch signal S_SIG including a lane configuration b according to the determined type and number of ports of the host connector 130. Accordingly, the second MAC terminals 261 to 264 may be disabled, and the PHY terminals 231 to 238 and the first MAC terminals 251 to 258 may be enabled. The enabled PHY terminals 231 to 238 and the enabled first MAC terminals 251 to 258 may form the first lanes 291 to 298.

Figure 16:
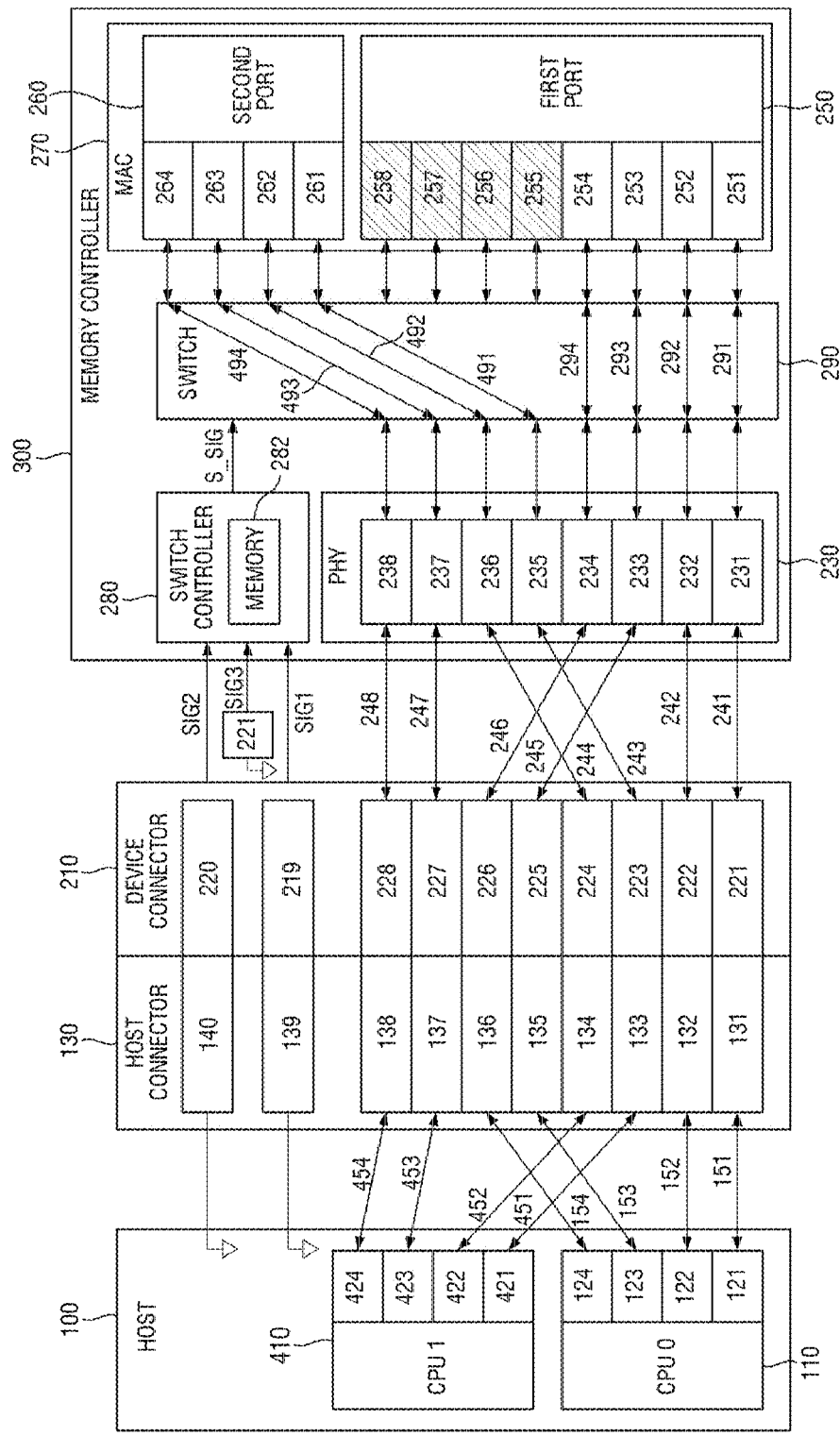

FIG. 16 is a block diagram explaining an operation of the memory controller of FIG. 5. For simplicity of description, differences from FIG. 15 will be mainly described.

Referring to FIG. 16, the first host terminals 121 to 124 may form a first host port with the host single pins 131, 132, 135, and 136 of the host connector 130. The first host port may include the first host lanes 151 to 154 connecting the first host terminals 121 to 124 to the host single pins 131, 132, 135, and 136.

The second host terminals 421 to 424 may form a second host port with the host single pins 133, 134, 137 and 138 of the host connector 130. The second host port may include the second host lanes 451 to 454 connecting the second host terminals 421 to 424 to the host single pins 133, 134, 137, and 138.

The first pin 219 may transmit the first signal SIG1 including the second logic level from the first host pin 139 to the switch controller 280. The second pin 220 may transmit the second signal SIG2 including the second logic level from the second host pin 140 to the switch controller 280. The third pin 221 may transmit the third signal SIG3 including the second logic level to the switch controller 280.

Referring to FIG. 6, the switch controller 280 may read the memory 282 and determine that the host connector 130 is a dual port and an AIC type from the first signal SIG1, the second signal SIG2, and the third signal SIG3.

The switch controller 280 may transmit, to the switch 290, the switch signal S_SIG including a lane configuration f according to the determined type and number of ports of the host connector 130. Accordingly, the first MAC terminals 255 to 258 may be disabled, and the PHY terminals 231 to 238, the first MAC terminals 251 to 254, and the second MAC terminals 261 to 264 may be enabled. The enabled PHY terminals 231 to 234 and the enabled first MAC terminals 251 to 254 may form the first lanes 291 to 294. The enabled PHY terminals 235 to 238 and the enabled second MAC terminals 261 to 264 may form the second lanes 491 to 494.

Figure 17:
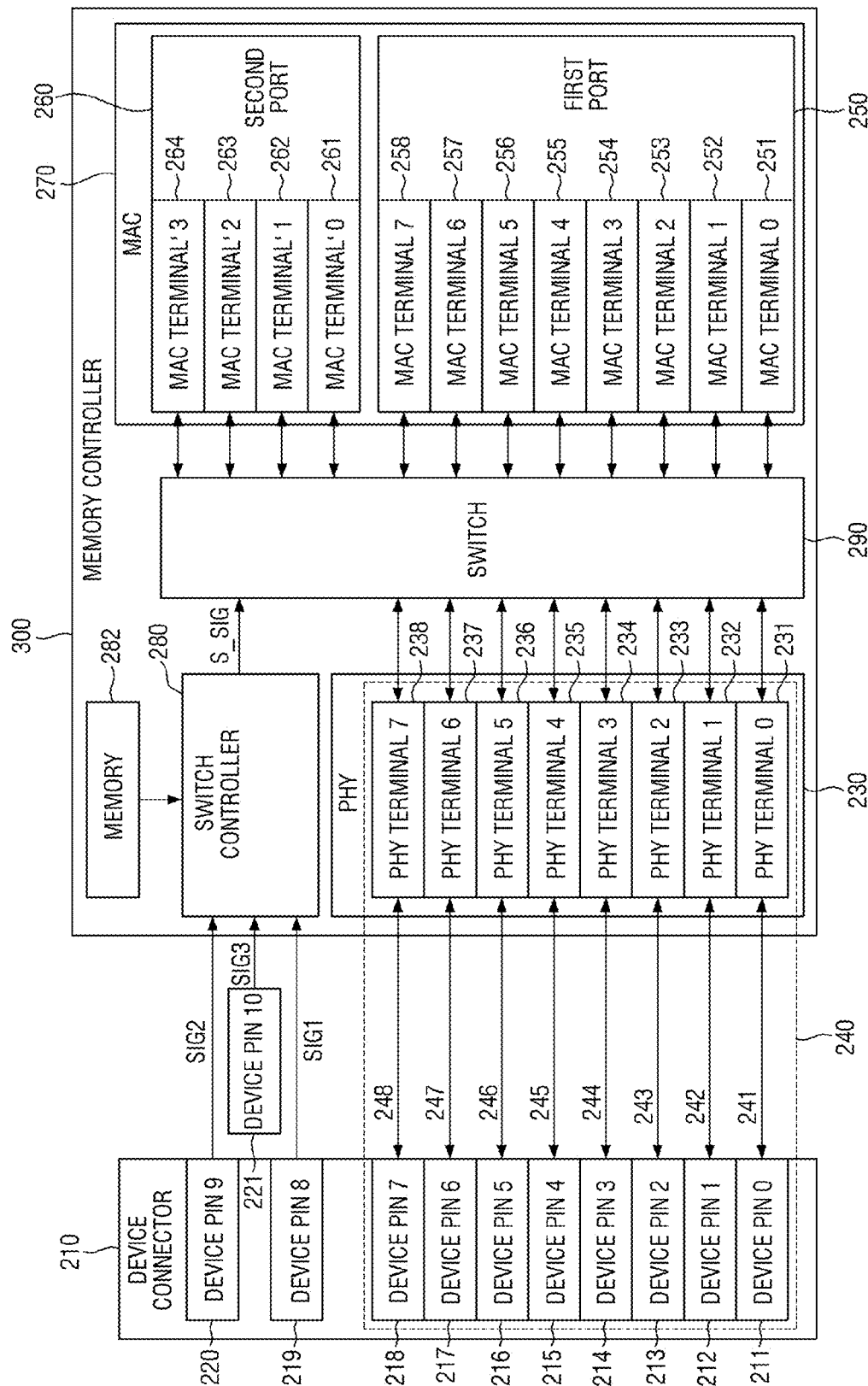
FIG. 17 is a block diagram explaining the memory controller of FIG. 1.

FIG. 17 is a block diagram explaining the memory controller of FIG. 1. For simplicity of description, differences from FIG. 5 will be mainly described.

Referring to FIG. 17, the memory controller 300 according to some example embodiments may include the PHY module 230, the MAC module 270, the switch controller 280, the memory 282, and/or the switch 290.

The memory 282 may be disposed outside the switch controller 280. When receiving the first signal SIG1, the second signal SIG2, and the third signal SIG3 from the first pin 219, the second pin 220, and the third pin 221, the switch controller 280, in response thereto, may read data stored in the memory 282 and determine the type and the number of ports of the host connector 130. Further, the switch controller 280 may read data stored in the memory 282 to determine a lane configuration between the PHY module 230 and the MAC module 270.

One or more of the elements disclosed above may include or be implemented in one or more processing circuitries such as hardware including logic circuits; a hardware/software combination such as a processor executing software; or a combination thereof. For example, the processing circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc.

In concluding the detailed description, those skilled in the art will appreciate that many variations and modifications can be made to the example embodiments without substantially departing from the principles of the present disclosure. Therefore, the disclosed example embodiments of the inventive concepts are used in a generic and descriptive sense only and not for purposes of limitation.

What is claimed is:

1. A memory controller comprising:
a physical layer (PHY) module including a plurality of PHY terminals, the plurality of PHY terminals including a first PHY terminal, each of the plurality of PHY terminals connected to a plurality of pins of a device connector;
a media access layer (MAC) module including a plurality of MAC terminals, the plurality of MAC terminals including a first MAC terminal and a second MAC terminal, the first MAC terminal and the second MAC terminal each configured to selectively connect to the first PHY terminal;
a switch controller configured to receive a signal of a host connector connected to the device connector from at least one of the plurality of pins, and output a switch signal in response to the signal of the host connector; and
a switch configured to form a first lane by connecting the first PHY terminal to the first MAC terminal, and disable the second MAC terminal, in response to the switch signal, wherein
the signal of the host connector includes information indicating a number of ports of the host connector, a type of the host connector, and a type of the device connector, and
in response to the type of the host connector or the type of the device connector being changed, the switch controller is further configured to change a configuration of device lanes between the PHY module and the device connector.

2. The memory controller of claim 1, wherein
the plurality of pins include a first pin and a third pin configured to transmit the information indicating the type of the host connector and the type of the device connector, and a second pin configured to transmit the information indicating the number of ports of the host connector; and
the switch controller is configured to receive the signal of the host connector from the first pin, the second pin, and the third pin.

3. The memory controller of claim 1, wherein the PHY module further includes a second PHY terminal that is disabled without being connected to the first MAC terminal.

4. The memory controller of claim 3, wherein the plurality of pins include:
a first single pin configured to form a device lane with the first PHY terminal; and
a second single pin configured to form the device lane with the second PHY terminal.

5. The memory controller of claim 4, wherein the PHY module further includes a third PHY terminal that does not form the device lane with the plurality of pins.

6. The memory controller of claim 1, wherein the switch controller further includes a memory storing information of the first lane, a type of the host connector, and a number of ports of the host connector according to the signal of the host connector, and is configured to read the memory in response to the signal of the host connector to output the switch signal.

7. The memory controller of claim 1, wherein the host connector includes a single port, and
the MAC module includes:
a first port including the first MAC terminal; and
a second port including the second MAC terminal, the second port being different from the first port.

8. The memory controller of claim 7, wherein the first port further includes a third MAC terminal that is disabled without being connected to the first PHY terminal.

9. The memory controller of claim 1, wherein the host connector includes a dual port, and
the MAC module includes:
a first port including the first MAC terminal and the second MAC terminal; and
a second port including a third MAC terminal forming a second lane with the first PHY terminal, the second port being different from the first port.

10. The memory controller of claim 9, wherein
the PHY module is configured to generate a first clock signal and a second clock signal different from each other,
the first port is configured to receive the first clock signal, and
the second port is configured to receive the second clock signal.

11. The memory controller of claim 9, wherein a number of the first MAC terminals is the same as a number of the third MAC terminals.

12. A memory controller comprising:
a physical layer (PHY) module including a plurality of PHY terminals, the plurality of PHY terminals including a first PHY terminal, each of the plurality of PHY terminals connected to a plurality of pins included in a device connector according to a type of the device connector;

a media access layer (MAC) module including a plurality of MAC terminals, the plurality of MAC terminals including a first MAC terminal and a second MAC terminal, the first MAC terminal and the second MAC terminal each configured to selectively form a first lane with the first PHY terminal, and selectively transmit and receive data to and from the PHY module through the first lane;

a switch controller configured to receive a signal of a host connector connected to the device connector from the plurality of pins, and output a switch signal in response to the signal of the host connector; and a switch configured to form the first lane by connecting the PHY terminal to the first MAC terminal, and disable the second MAC terminal, in response to the switch signal, wherein the signal of the host connector includes information indicating a number of ports of the host connector, a type of the host connector, and a type of the device connector, and in response to the type of the host connector or the type of the device connector being changed, the switch controller is further configured to change a configuration of device lanes between the PHY module and the device connector.

13. The memory controller of claim 12, wherein the plurality of pins include:
a first single pin configured to transmit and receive data to and from the PHY module through a device lane; and
a second single pin configured to not transmit and receive data to and from the PHY module through the device lane.

14. The memory controller of claim 12, wherein
the host connector includes a single port, and
the MAC module includes a first port including the first MAC terminal and a second port including the second MAC terminal, the second port being separated from the first port.

15. The memory controller of claim 12, wherein
the host connector includes a dual port;
the MAC module includes:
  a first port including the first MAC terminal and the second MAC terminal, and
  a second port including a third MAC terminal configured to form a second lane with the first PHY terminal, and configured to transmit and receive data to and from the PHY module through the second lane, the second port being different from the first port; and
a system clock of the first port is different from a system clock of the second port.

16. A memory controller comprising:
a physical layer (PHY) module including a first PHY terminal and a second PHY terminal connected to a plurality of pins included in a device connector according to a type of the device connector;
a media access layer (MAC) module including a first port including a plurality of first MAC terminals and a second port including a plurality of second MAC terminals, the plurality of first MAC terminals and the plurality of second MAC terminals each configured to selectively connect to one of the first PHY terminal and the second PHY terminal;
a switch controller configured to receive a connector signal indicating a number of ports of a host connector connected to the device connector, a type of the host connector, and a type of the device connector from the plurality of pins, and output a switch signal in response to the connector signal; and
a switch configured to form a first lane by connecting at least some of the plurality of first MAC terminals with the second PHY terminal, and/or configured to form a second lane by connecting at least some of the plurality of second MAC terminals with the second PHY terminal according to the switch signal,
wherein the MAC module is configured to transmit and receive data to and from the PHY module through the first lane and/or the second lane, and
in response to the type pf the host connector or the type of the device connector being changed, the switch controller is further configured to change a configuration of device lanes between the PHY module and the device connector.

17. The memory controller of claim 16, wherein a number of the plurality of first MAC terminals is different from a number of the plurality of second MAC terminals.

18. The memory controller of claim 16, wherein
the PHY module is configured to generate a first clock signal and a second clock signal different from each other;
the first port is configured to receive the first clock signal through the first lane; and
the second port is configured to receive the second clock signal through the second lane.

19. The memory controller of claim 16, wherein a number of the first lanes is the same as a number of the second lanes.

* * * * *